United States Patent
Thagadur Shivappa

(10) Patent No.: US 10,979,843 B2
(45) Date of Patent: Apr. 13, 2021

(54) SPATIALIZED AUDIO OUTPUT BASED ON PREDICTED POSITION DATA

(71) Applicant: QUALCOMM Incorporated, San Diego, CA (US)

(72) Inventor: Shankar Thagadur Shivappa, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 112 days.

(21) Appl. No.: 15/094,620

(22) Filed: Apr. 8, 2016

(65) Prior Publication Data

US 2017/0295446 A1    Oct. 12, 2017

(51) Int. Cl.
| | | |
|---|---|---|
| *H04S 7/00* | (2006.01) | |
| *G06F 3/16* | (2006.01) | |
| *G06F 3/01* | (2006.01) | |
| *H04S 3/00* | (2006.01) | |
| *H04R 5/033* | (2006.01) | |

(52) U.S. Cl.
CPC .............. *H04S 7/304* (2013.01); *G06F 3/011* (2013.01); *G06F 3/012* (2013.01); *G06F 3/16* (2013.01); *H04S 3/008* (2013.01); *H04S 7/303* (2013.01); *H04R 5/033* (2013.01); *H04R 2203/12* (2013.01); *H04R 2430/23* (2013.01); *H04S 2400/11* (2013.01); *H04S 2400/15* (2013.01); *H04S 2420/01* (2013.01); *H04S 2420/11* (2013.01)

(58) Field of Classification Search
CPC ........ G06F 3/0346; G06F 3/011; G06F 3/012; H04R 2430/23; H04R 5/033; H04R 2203/12; H04S 7/304; H04S 2420/01; H04S 7/308; H04S 2420/11; H04S 2400/15; H04S 2400/11; H03S 7/303; G03F 3/16
See application file for complete search history.

(56) References Cited

U.S. PATENT DOCUMENTS

| | | | |
|---|---|---|---|
| 6,021,206 A | 2/2000 | McGrath | |
| 6,259,795 B1 | 7/2001 | McGrath | |
| 7,917,236 B1 * | 3/2011 | Yamada | G10K 15/02 381/18 |
| 8,396,233 B2 | 3/2013 | Ma et al. | |
| 9,648,438 B1 * | 5/2017 | Petrov | H04S 7/303 |

(Continued)

FOREIGN PATENT DOCUMENTS

| | | |
|---|---|---|
| CN | 103218198 A | 7/2013 |
| CN | 103568992 A | 2/2014 |

(Continued)

OTHER PUBLICATIONS

Wu et al, Head Motion and Latency Compensation on Llocalization of 3D Sound in virtual reality,1997.*

(Continued)

*Primary Examiner* — Davetta W Goins
*Assistant Examiner* — Kuassi A Ganmavo
(74) *Attorney, Agent, or Firm* — Moore IP

(57) ABSTRACT

In a particular aspect, an audio processing device includes a position predictor configured to determine predicted position data based on position data. The audio processing device further includes a processor configured to generate an output spatialized audio signal based on the predicted position data.

30 Claims, 9 Drawing Sheets

(56) References Cited

U.S. PATENT DOCUMENTS

| | | | |
|---|---|---|---|
| 2002/0103617 A1* | 8/2002 | Uchiyama | G06T 7/74 702/150 |
| 2006/0050909 A1* | 3/2006 | Kim | H04R 3/02 381/309 |
| 2008/0167805 A1* | 7/2008 | Hess | A63F 13/02 701/408 |
| 2012/0093320 A1* | 4/2012 | Flaks | H04S 7/301 381/17 |
| 2012/0290257 A1 | 11/2012 | Hodge et al. | |
| 2013/0041648 A1 | 2/2013 | Osman | |
| 2013/0064375 A1* | 3/2013 | Atkins | H04S 7/301 381/17 |
| 2013/0064376 A1 | 3/2013 | Kaburlasos et al. | |
| 2013/0121515 A1 | 5/2013 | Hooley et al. | |
| 2013/0208897 A1 | 8/2013 | Vincent et al. | |
| 2014/0118631 A1* | 5/2014 | Cho | G02B 27/017 348/836 |
| 2014/0233917 A1* | 8/2014 | Xiang | G11B 27/031 386/285 |
| 2014/0354515 A1* | 12/2014 | LaValle | G06F 3/012 345/8 |
| 2014/0361977 A1* | 12/2014 | Stafford | G02B 27/0093 345/156 |
| 2015/0221313 A1 | 8/2015 | Purnhagen et al. | |
| 2015/0230040 A1 | 8/2015 | Squires et al. | |
| 2015/0248889 A1 | 9/2015 | Dickins et al. | |
| 2015/0317832 A1* | 11/2015 | Ebstyne | G06F 3/011 345/633 |
| 2016/0123759 A1* | 5/2016 | Miller | G06F 3/0482 701/400 |
| 2016/0182996 A1* | 6/2016 | Takumai | H04R 1/403 381/303 |
| 2016/0183024 A1* | 6/2016 | Karkkainen | H04S 7/303 381/17 |
| 2016/0295341 A1* | 10/2016 | Mentz | H04S 7/304 |
| 2017/0045941 A1* | 2/2017 | Tokubo | G06F 3/167 |
| 2017/0048639 A1* | 2/2017 | Melkote | H04S 3/02 |
| 2017/0153866 A1* | 6/2017 | Grinberg | G06F 3/165 |
| 2018/0249274 A1* | 8/2018 | Lyren | H04S 7/303 |

FOREIGN PATENT DOCUMENTS

| | | | |
|---|---|---|---|
| EP | 2879402 A1 | 6/2015 | |
| WO | 2015076930 A1 | 5/2015 | |
| WO | 2015192117 A1 | 12/2015 | |
| WO | WO 2015192117 A1 * | 12/2015 | G06F 3/012 |

OTHER PUBLICATIONS

Friedmann et al, Synchronization in Virtual Realities, MIT Media Lab,1991.*

Friston et al, Measuring Latency in Virtual Environment, 2014.*

Adelstein et al, PredictivenCompensator optimization for head tracking lag in virtual Environment, NASA, 2001.*

Joppich et al, Adaptive human motion Prediction using Multiple Models Approaches, 2013.*

Funkhouser et al, Real time Acoustic Modeling for Distributed Virtual Environments, ACM, 1999.*

Keyrouz et al, Humanoid Binaural Sound tracking Using Kalman Filtering and HRTF, Springer (Year: 2007).*

Simonite, T., "Microsoft's '3-D Audio' Gives Virtual Objects a Voice," MIT Technology Review, Jun. 4, 2014, MIT, Cambridge, Massachusetts, 3 pages.

Lalwani, M., "Surrounded by Sound: How 3D Audio Hacks your Brain," retrieved from <<http://www.theverge.com/2015/2/8021733/3d-audio-3dio-binaural-immersive-vr-sound-times-square-new-york>>, The Verge, New York, New York, pp. 1-11.

"Developer Center—Documentation and SDKs Oculus," retrieved from <<https://developer.oculus.com/documentation/intro-vr/latest/concepts/bp_intro/>>, retrieved on Jan. 27, 2016, Oculus VR, LLC, Irvine, California, pp. 1-12.

Dorrier, J., "What's Missing from Virtual Reality? Immersive 3D Soundscapes," SingularityHUB, retrieved from <<http://singularityhub.com/2014/07/06/virtual-reality-needs-an-immersive-3d-soundscape/>>, Jul. 6, 2014, Singularity University, Moffett Federal Airfield, California, pp. 1-4.

"Oculus Details HRTF Audio in CES Crescent Bay Units," Jan. 7, 2015, retrieved from <<http://vrfocus.com/archives/10273/oculus-details-hrtf-audio-ces-crescent-bay-units/>>, VRfocus, 4 pages.

"Blog—Oculus @ CES 2015," Jan. 6, 2015, retrieved from <<https:www.oculus.com/en-us/blog/oculus-ces-2015/>>, Oculus VR, LLC, Irvine, California, pp. 1-4.

Nordmann, J., "Immersive Audio for VR, 3D Audio Production, Delivery & Rendering," 2015 Annual Technical Conference & Exhibition, Hollywood, CA, Oct. 2015, Society of Motion Picture & Television Engineers, United States, 49 pages.

"Ambisonic Data Exchange Formats," Wikipedia, the free encyclopedia, Retrieved from <<https://en.wikipedia.org/wiki/Ambisonic_data_exchange_formats#Component_ordering>>, Retrieved on Dec. 17, 2015, Wikimedia Foundation, San Francisco, CA, pp. 1-9.

Lavalle, S.M., et al., "Head Tracking for the Oculus Rift," Robotics and Automation (ICRA), 2014 IEEE International Conference on, Jun. 2014, IEEE, Piscataway, NJ, pp. 187-194.

"Developer Center—Documentation and SDKs Oculus," retrieved from <<https://developer.oculus.com/documentation/audiosdk/latest/concepts/osp-unity-mobile-latency/>>, retrieved on Apr. 8, 2016, Oculus VR, LLC, Irvine, California, pp. 1-3.

"Binaural Micrphone w/Ears—Radiant Images," retrieved from <<http://www.radiantimages.com/audio/mic/1021-360-mic>> retrieved on Apr. 8, 2016, Radiant Images, Los Angeles, CA, 2 pages.

International Search Report and Written Opinion—PCT/US2017/018571—ISA/EPO—dated Jun. 21, 2017.

Wikipedia: "Binaural Recording", Retrieved from Internet on Mar. 3, 2018, https://en.wikipedia.org/wiki/Binaural_recording, pp. 1-6.

* cited by examiner

SPATIALIZED AUDIO OUTPUT BASED ON PREDICTED POSITION DATA

I. FIELD

The present disclosure is generally related to devices and methods that generate a spatialized audio output.

II. DESCRIPTION OF RELATED ART

Advances in technology have resulted in smaller and more powerful computing devices. For example, a variety of portable personal computing devices, including wireless telephones such as mobile and smart phones, tablets and laptop computers are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing and networking capabilities.

Spatialized audio rendering systems may output sounds that enable user perception of a three-dimensional audio space. For example, a user may be wearing headphones or a virtual reality (VR) head mounted display (HMD), and movement (e.g., translational or rotational movement) of the user (e.g., of the user's head) may cause a perceived direction or distance of a sound to change. Performing spatialized audio processing may take a discernable amount of time, resulting in audio latency. If the audio latency is too large, the change in the perceived direction or distance to the sound may lag behind the movement of the user, which may be noticeable to the user. Additionally, performing spatialized audio processing may use substantial processing resources. Such processing resources may not be available in at least some electronic devices (e.g., some mobile phones), thereby limiting spatialized audio processing functionality of such devices.

III. SUMMARY

In a particular aspect, an audio processing device includes a position predictor configured to determine predicted position data based on position data. The audio processing device further includes a processor configured to generate an output spatialized audio signal based on the predicted position data.

In a particular aspect, a method of audio processing includes receiving, at a processor, position data from one or more sensors. The method includes determining, at the processor, predicted position data based on the position data. The method further includes generating, at the processor, an output spatialized audio signal based on the predicted position data.

In a particular aspect, an apparatus includes means for determining predicted position data based on position data. The apparatus further includes means for generating an output spatialized audio signal based on the predicted position data.

In a particular aspect, a non-transitory computer readable medium stores instructions that, when executed by a processor, cause the processor to receive position data from one or more sensors. The instructions cause the processor to determine predicted position data based on the position data. The instructions further cause the processor generate an output spatialized audio signal based on the predicted position data.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1A:
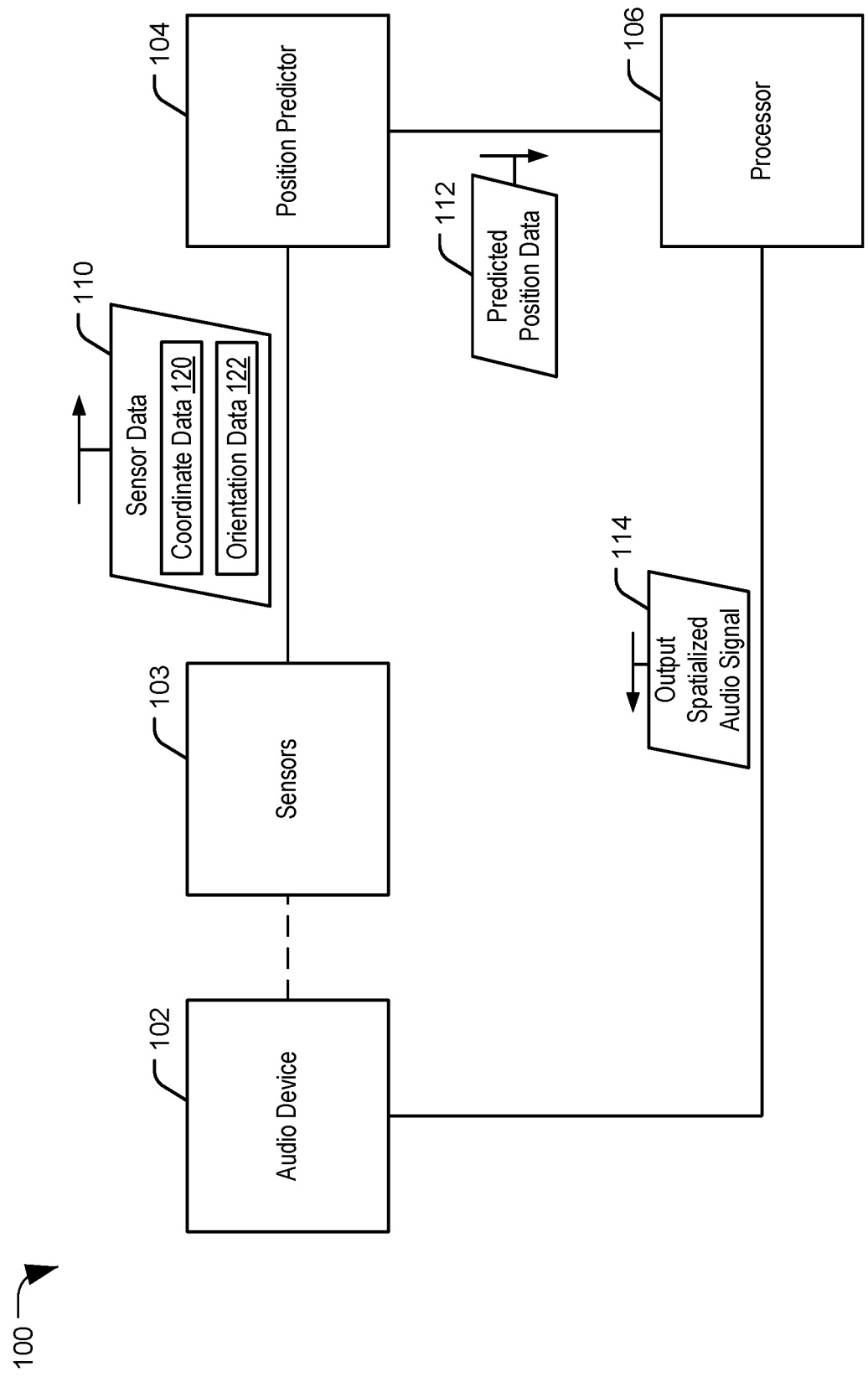
FIG. 1A is a block diagram of a first implementation of an audio processing device configured to generate an output spatialized audio signal based on predicted position data.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Systems, devices, and methods for generating spatialized audio signals based on predicted position data are disclosed. Position data may indicate a position of the audio device or a position of a user. The audio processing device may determine predicted position data that indicates a predicted position of the audio device (or the user) at a particular (e.g., future) time based on the position data. For example, the audio processing device may store historical position data, and the position data and the historical position data may be analyzed to determine a velocity, an estimated trajectory, or another indication of a predicted movement path. The predicted position data may indicate a predicted position along the predicted movement path (e.g., the trajectory) at a particular time. The particular time may be selected to account for a latency (e.g., a delay) associated with processing spatialized audio signals.

To illustrate, the audio processing device may provide spatialized audio signals to an audio device that generates audio outputs (e.g., auditory sounds) for a user. In a particular implementation, the audio processing device may be integrated in a virtual reality (VR) system or augmented reality (AR) system. The audio outputs may be three-dimensional (3D) audio outputs that enable a user to perceive a direction or a distance of sounds in a 3D audio space relative to a location of a user, either in a game (or other virtual reality environment) or in reality. For example, if the user is playing a game and a car drives to the left of the user in the game, the audio output enables the user to perceive a sound of a car as coming from the user's left side. If the user turns to the right in the game such that the car is behind the user, the audio processing device processes the spatialized audio signal to cause the audio output to change such that the user experiences the sound of the car as coming from behind the user. However, a latency (e.g., a delay) associated with processing the spatialized audio signal may cause a change in the audio output to lag behind a change in the user's position or orientation, which may be noticeable to the user.

To prevent or reduce a likelihood of an audio output from lagging behind the user's movement, the audio processing device may generate an output spatialized audio signal based on the predicted position data instead of based on the position data (e.g., data indicative of a "current," "actual," or "real time" position of the user). To illustrate, the audio processing device may estimate that the latency is approximately 10 milliseconds (ms), and in response, the audio processing device may determine predicted position data indicating a predicted position of the user (e.g., a prediction of where the user, or user's head will be 10 ms into the future). The audio processing device may process the spatialized audio signal based on the predicted position data to cause the spatialized audio signal to change a perceived direction or distance of a sound to correspond to the predicted position data. As a particular, non-limiting example, the audio processing device may generate a rotation matrix based on the predicted position data and the audio processing device may apply the rotation matrix to the spatialized audio signal to generate an output spatialized audio signal. Thus, when processing of the spatialized audio signal is complete (e.g., after the latency), the output spatialized audio signal is in synch with the position and orientation of the user, which may prevent or reduce a likelihood of the audio from lagging and improve a user's experience.

To further illustrate, an audio processing device may receive position data from one or more sensors that are configured to track the position and orientation of a user (or of an audio device worn by the user), or to track the position and orientation of the user in a virtual environment. For example, the audio processing device may receive position data from one or more location sensors, one or more motion sensors, or a combination thereof, that are integrated within a head mounted display (HMD) of a VR system. As another example, the audio processing device may receive position data from one or more cameras or other optical sensors that track a position and orientation of a user. As another example, the audio processing device may receive position data from a controller of a VR system, a gesture capture device, a motion capture device, or some other means of control for a VR system or an AR system. In a particular implementation, the audio processing device is coupled to the audio device. For example, the audio processing device may be a mobile telephone that is communicatively coupled to the audio device (e.g., the HMD, a headset, a speaker array, etc.). In another particular implementation, the audio processing device is integrated within the audio device. For example, the audio processing device may include a processor that is integrated within the audio device (e.g., the HMD, the headset, the speaker array etc.) and that is configured to perform one or more operations described herein.

In some implementations, the audio processing device may determine predicted position data based on the current position data, the historical position data, or both. For example, the audio processing device may analyze current position data and the historical position data to determine a predicted trajectory of a user (or user's head), and the predicted position data may indicate a position at a particular time along the predicted trajectory. The predicted trajectory may be determined based on a velocity, based on an acceleration, using Kalman filtering, using particle filtering, or using other methods. As described above, the particular time may be determined based on a latency associated with processing spatialized audio signals at the audio processing device. The audio device may process a spatialized audio signal (e.g., by generating an applying a rotation matrix and performing binauralization, as a particular example) to cause a perceived direction or distance of a sound to change based on the predicted position data such that, when the processing is complete (e.g., after the latency), the perceived direction or distance of the sound will correspond to, or by in synch with, the position and orientation of the user (in the VR world or in reality). Thus, changes to perceived directions or distances of sounds may more closely track the user's movements (in the VR world or in reality), which may improve user experience.

In another implementation, the audio processing device may store multiple predicted trajectories corresponding to movement of the user (in the VR world or in reality) during presentation of a particular spatialized audio signal. Additionally or alternatively, the audio processing device may access at least one other device (e.g., via a wireless interface or other network interface) that stores predicted trajectory data and spatialized audio signals. For example, the audio device may receive a data stream that includes predicted trajectory data, spatialized audio signals, or both, from another device, such as a server. The audio processing device may select a stored predicted trajectory that most closely matches the estimated trajectory, and the audio processing device may access a processed spatialized audio signal corresponding to the stored predicted trajectory. The processed spatialized audio signal may be used to initiate an audio output at the audio device. In such implementations, where the processed audio signals are pre-processed and stored (e.g., at a memory), the audio processing device may provide a spatialized audio output experience without processing spatialized audio signals in real time. Additionally, in some implementations, the audio processing device may determine whether available processing resources are sufficient for real time processing (e.g., based on the predicted position data) or whether an output is to be generated based on pre-processed spatialized audio signals, and may switch between real time and pre-processed modes based on changing conditions at the audio processing device.

Referring to FIG. 1A, a first implementation of an audio processing device is shown and generally designated 100. The audio processing device 100 is configured to generate an output spatialized audio signal based on predicted position data. The audio processing device 100 includes an audio device 102, one or more sensors 103, a position predictor 104, and a processor 106. In a particular implementation illustrated in FIG. 1A, the position predictor 104 is external to and distinct from the sensors 103 and the processor 106. In another particular implementation, the position predictor 104 may be included in the sensors 103, as further described with reference to FIG. 1B. In another particular implementation, the position predictor 104 may be included in the processor 106, as further described with reference to FIG. 1C.

The audio device 102 may include one or more devices that are configured to output auditory sound to a user. For example, the audio device 102 may include a transducer (or multiple transducers). As described further herein, spatialized audio signals may be rendered using three-dimensional (3D) rendering techniques to cause the audio device 102 to output the auditory sounds. As a non-limiting example, spatialized audio signals may be rendered using higher order ambisonics (HOA) techniques. Due to the 3D rendering, a user may perceive the auditory sound as being in 3D, which may enable the user to perceive direction, distance, or both of one or more sound sources corresponding to the auditory sound. For example, a user may perceive a sound of a door opening to their right (but not to their left) for an auditory sound of an opening door.

In a particular implementation, the audio device 102 includes (or is integrated within) a head mounted display (HMD) of a virtual reality (VR) system or an augmented reality (AR) system. For example, the HMD may include headphones for playing audio in addition to a display screen for displaying visual information. The VR system (or the AR system) may be configured to display media content, such as movies, and to provide interactive content, such as video games, presentations, virtual meetings, etc. The visuals and the audio output by the virtual reality system may change based on movement of the user (e.g., movement of the user's head). For example, if a user rotates his or her head to the side, the visuals output by the virtual reality system may change to represent a view of the side, and the audio output by the virtual reality system may change such that sounds that previously were perceived as emanating from the side appear to emanate from a forward direction after the rotation. Additionally or alternatively, the sensors 103 may be included or integrated in a control interface (e.g., a controller) between the user and the VR system (or the AR system). For example, the VR system (or the AR system) may include a hand-held controller configured to receive user inputs, and position, orientation, and movement of a user within a virtual environment may be determined based on the user input. As an example, the user may use a joystick, a control pad, a tablet computer, a mouse, or another peripheral device to enter control the user's movements through a virtual environment presented by the VR system (or the AR system). The sensors 103 may also include one or more touch sensors, gesture sensors, voice sensors, or other sensor devices, and the user input may include voice commands, gestures, movements or changes in pressure on a touch pad, or other forms of user input to control the VR system (or the AR system).

In another particular implementation, the audio device 102 may include a headset (e.g., a pair of headphones). The sound output by the headset may change based on movement of the user (e.g., movement of the user's head). For example, the user may be listening to a concert and may perceive a flute to be playing to the left. If the user turns to the left, the sound may change such that the user perceives the flute to be playing from in front of the user. Thus, sound output by the audio device 102 may change based on a position of the audio device 102, an orientation of the audio device 102, or both. In some implementations, the position (and orientation) of the audio device 102 may correspond to a position (and orientation) of the user's head. For example, because the user wears the HMD (or the headset) on their head, the position (and orientation) of the audio device 102 represents the position (and orientation) of the user's head.

In another particular implementation, the audio device 102 may include one or more speakers arranged as a speaker array. The one or more speakers may include one or more audio amplifiers and one or more audio filters configured to implement beamforming to direct audio waves (e.g., audio outputs) in particular directions. In this implementation, the audio device 102 (e.g., the audio filters) may be configured to direct the audio outputs in particular directions based on spatialized audio signals. Thus, a user listening to audio content via the speaker array may be able to perceive changes in a direction or distance of a sound source based on movement of the user (e.g., the user's head) due to the beamforming. In some implementations, to enable the beamforming, the audio device 102 may receive control data in addition to spatialized audio signals. The control data may be used by the audio filters to perform the beamforming operations.

The one or more sensors 103 may be configured to determine sensor data 110, which may correspond to position data. For example, the one or more sensors 103 may include an accelerometer, a gyro sensor, an orientation sensor, a linear position sensor, a proximity sensor, a motion sensor, an angular position sensor, a global positioning system (GPS) sensor, an ultrasound sensor, or any other sensor(s) capable of determining a translational position (e.g., a location in a coordinate space, such as x-y-z coordinates), an orientation (e.g., pitch, yaw, and roll angles, as further described with reference to FIG. 2), or both. The sensor data 110 may thus include coordinate data 120, orientation data 122, or both.

In some implementations, the one or more sensors 103 are integrated within the audio device 102. For example, the audio device 102 may include the HMD of the virtual reality system, the HMD having multiple sensors configured to determine a location and an orientation of the audio device 102, and by extension, the user. In other implementations, the one or more sensors 103 may be separate from (e.g., external to) the audio device 102. For example, the one or more sensors 103 may include one or more optical sensors, such as cameras, that are configured to determine a position and an orientation of the user. The one or more optical sensors may be configured to track a location of the user, movement of the user, or both. In some implementations, the movement and orientation may be limited to movement and orientation of the user's head. In other implementations, the movement and orientation of the user may include movement and orientation of the user's torso, the user as a whole, or other measurements. The one or more optical sensors may be configured to output the sensor data 110 that is indicative of the position and the orientation of the user. In other implementations, the sensors 103 may be integrated in a control interface associated with the audio device 102, and the sensor data 110 may indicate a position of the user in a virtual environment (or an augmented reality environment). Thus, as used herein, "position data" may refer to a position of the user (or the audio device 102) in the "real world," or a position of the user in a virtual environment or augmented reality environment.

The position predictor 104 is configured to generate predicted position data 112 based on position data, such as the sensor data 110. In a particular implementation, the position predictor 104 is configured to store historical position data and to determine the predicted position data 112 based on the historical position data and the sensor data 110. For example, the position predictor 104 may compare a position, an orientation, or both indicated by the sensor data 110 to one or more previous positions and orientations indicated by the historical position data to determine a predicted trajectory of the user. To illustrate, different measured positions or orientations (or both) may be interpolated to determine a predicted position or a predicted orientation (or both). The position predictor 104 may determine a predicted position of the user (or the audio device 102) using the predicted trajectory (e.g., the predicted position may be a position along the predicted trajectory that is associated with a particular time). Additionally or alternatively, the position predictor 104 may determine a velocity of the audio device 102 (or the user), an acceleration of the audio device 102 (or the user), or both based on sensor data 110 and the historical position data. The predicted position may be determined based on the velocity, the acceleration, or both, and the predicted position may be indicated by the predicted position data 112. For example, the predicted position data 112 may indicate predicted coordinates, predicted orientation measurements, other information indicative of the predicted position, or a combination thereof.

The position predictor 104 may be configured to provide the predicted position data 112 to the processor 106. The processor 106 may include one or more processors or processing units, a digital signal processor (DSP), an application specific integrated circuit (ASIC), a field programmable gate array (FPGA), or a combination thereof. In some examples, the processor 106 may be configured to execute one or more computer-readable instructions to perform the operations described herein. For example, the processor may be coupled to a memory or another non-transitory computer readable medium that stores instructions that are executable by the processor. Alternatively, or in addition, one or more operations described herein may be performed using hardware, such as dedicated circuitry.

The processor 106 may be configured to generate an output spatialized audio signal 114 based on the predicted position data 112. The output spatialized audio signal 114 may include a spatialized audio signal that has been modified or selected based on the predicted position data 112. The output spatialized audio signal 114 may be provided to the audio device 102 for use in generating an audio output (e.g., an auditory sound). In a particular implementation, the processor 106 (or an additional component of the audio processing device 100) may be configured to perform 3D sound rendering to generate a 3D output audio signal, and the 3D output audio signal may be used to generate the audio output at the audio device 102. Performing 3D sound rendering may include performing binauralization, higher order ambisonic (HOA) processing, head-related transfer function (HRTF) filtering, binaural room impulse response (BRIR) filtering, object-based 3D audio processing, channel-based surround sound processing, other 3D audio rendering operations, or a combination thereof. Additionally, in some implementations, post-processing such as amplification, impedance matching, additional filtering, digital-to-analog conversion, or a combination thereof, may be performed prior to using the 3D output audio signal to generate an audio output at the audio device 102. In a particular implementation, the output spatialized audio signal 114 is a HOA signal.

In some implementations, the audio processing device may receive spatialized audio signals for processing from at least one other device. For example, the audio processing device 100 may include a wireless interface (or other network interface) that is configured to send data to and receive data from at least one other device, and the at least one other device may store the spatialized audio signals. To illustrate, the audio processing device 100 may receive one or more data streams from another device, such as a server, via the wireless interface. The one or more data streams may include spatialized audio signals, other data used to process the spatialized audio signals (as further described with reference to FIG. 2), or both. Additionally or alternatively, the audio processing device 100 may include a memory that stores the spatialized audio signals, the other data (e.g., predicted trajectory data), or both.

In a particular implementation, the processor 106 may be configured to process spatialized audio signals in "real time" (or near real time). Real time (or near real time) processing refers to processing a spatialized audio signal to modify the spatialized audio signal during playback of the spatialized audio signal such that the spatialized audio signal is perceived to be in synch with user movement. The processor 106 may be configured to process an input spatialized audio signal based on the predicted position data 112 to generate the output spatialized audio signal 114. To illustrate, if the user's head moves or rotates, or if the user moves or rotates in the virtual environment, the processor 106 modifies the input spatialized audio file such that a perceived direction or distance of one or more sound sources in a 3D space is modified based on the movement. As non-limiting examples, of a sound source may be a character speaking in a movie, an instrument playing in a concert, a person speaking during a teleconference, a vehicle making noise in a virtual reality video game, or any other source of sound corresponding to the input spatialized audio signal.

The processor 106 may be configured to determine a rotation based on the predicted position data 112, and the rotation may be applied to the input spatialized audio signal to generate the output spatialized audio signal 114. In a particular implementation, the rotation may correspond to a rotation matrix, and the processor 106 may determine and apply a rotation matrix to the input spatialized audio signal to generate the output spatialized audio signal 114. The rotation matrix is further described with reference to FIG. 4. In another particular implementation, the processor 106 may be configured to determine one or more vectors based on the predicted position data 112 and to apply the one or more vectors to the input spatialized audio signal to apply the rotation. In another particular implementation, the processor 106 may be configured to determine a data set based on the predicted position data 112 and to apply one or more elements of the data set to the input spatialized audio signal to apply the rotation. In another particular implementation, the processor 106 may be configured to retrieve one or more values from a lookup table, a database, or another storage location, based on an azimuth and an elevation, or other information indicated by the predicted position data 112. The processor 106 may be further configured to apply the one or more values to the input spatialized audio signal to apply the rotation.

Because processing (e.g., generating and applying the rotation matrix, performing additional rendering steps, or both) the input spatialized audio signal may be a complex and resource-intensive process for the processor 106, latency may be introduced. For example, a latency of 10 ms may be associated with processing the input spatialized audio signal to generate the output spatialized audio signal. Illustrative examples of determining audio processing latency are further described with reference to FIG. 4. Thus, a change in the audio output (e.g., a change in a perceived direction or distance of a sound) may lag behind a user's movements by the amount of the latency, which may lead to synchronization issues that are noticeable to the user.

To avoid (or reduce) synchronization issues and lag time, the processor 106 may be configured to generate the output spatialized audio signal 114 based on the predicted position data 112. For example, instead of processing the input spatialized signal based on position data indicative of a current position, the processor 106 may process the input spatialized audio signal based on predicted position data indicative of a predicted position at a future time. The future time may be selected to compensate for the latency. For example, if the latency is 10 ms, the processor 106 may process the input spatialized audio signal based on a predicted position corresponding to 10 ms in the future such that, if the predicted position is correct, the sound output at the future time matches the position and orientation of the audio device 102 (or the user) at that future time. Thus, by generating the output spatialized audio signal 114 based on the predicted position data 112, lag between a user's movements and a change in perception of a direction or distance of a sound may be eliminated (or reduced). In some implementations, the processor 106 may periodically compare the predicted position data 112 to subsequent position data to refine equations or algorithms used to generate the predicted position data 112, or to confirm that previously predicted positions are accurate within designated tolerances.

In another particular implementation, the processor 106 may not process spatialized audio signals in real time. Instead, an input spatialized audio signal may be pre-processed one or more times, and the processed spatialized audio signals may be stored at a memory. Each processed spatialized audio signal may correspond to a trajectory. For example, a trajectory of the audio device 102 (or the user) may be measured during presentation of the input spatialized audio signal, and the input spatialized audio signal may be processed based on the trajectory to generate a processed spatialized audio signal. To illustrate, the input spatialized audio signal may correspond to a movie, the head movements of multiple users may be tracked while the users watch the movie, and each user's movement may be converted into a trajectory. Due to differences in head size, relative interest in movie subject matter, etc. different trajectories may be determined for adults vs. children, etc. Each of the trajectories may be used to pre-process and store a spatialized audio signal. Then, when a new user watches the movie, the processor 106 may be configured to determine a predicted trajectory based on the predicted position data 112 of the new user. After determining the predicted trajectory, the processor 106 may access (e.g., by retrieving from the memory) a pre-processed spatialized audio signal associated with a trajectory that substantially matches (or is closest to) the predicted trajectory. To illustrate, if the new user is a child, the child's movements may result in selecting a pre-processed "for children" spatialized audio signal rather than a pre-processed "for adults" spatialized audio signal. The processor 106 may use the retrieved spatialized audio signal as the output spatialized audio signal 114. In this manner, the processor 106 is able to provide 3D audio functionality while eliminating or reducing lag and without having to process spatialized audio signals in real time. This may enable processors or devices having less computational resources (such as some processors in mobile devices, as a non-limiting example) to provide 3D audio functionality that would otherwise be too computationally intensive. Selecting processed audio signals based on predicted trajectories is further described with reference to FIG. 2.

Additionally, in a particular implementation, the processor 106 may be configured to determine whether to perform real time audio processing or to use processed audio signals based on available processing resources. Such determination is further described with reference to FIG. 2.

In a particular implementation, one or more components of the audio processing device 100 may be included in or integrated in a vehicle. As an illustrative example, a seat inside an automobile may be equipped with multiple speakers (e.g., the audio device 102), and a display unit within the automobile may be configured to execute a VR game (or AR game). A user seated in the automobile may interact with the VR game (or AR game) using a user interface device, such as a handheld controller, that includes the sensors 103. The position predictor 104 and the processor 106 may be incorporated in an electronic component of the vehicle. As the user interacts with and move through a virtual environment associated with the VR game, sounds output by the speakers in the seat may be modified to enable user perception of changes in directionality or distances of sounds. To prevent changes in the sounds from lagging behind changes in the user's position or orientation in the virtual world, output spatialized audio signals may be generated based on predicted position data, as described above. In other implementations, spatialized audio signals may be processed for 3D audio applications, teleconference applications, multimedia applications, or other applications.

In another particular implementation, one or more components of the audio processing device may be included in or integrated in a "drone" (e.g., an unmanned vehicle, such as a remote-controlled vehicle or an autonomous vehicle). As a non-limiting example, the drone may be an unmanned aerial vehicle (UAV). To illustrate, a drone may include the sensor 103 and may be configured to detect a position and an orientation of the user, for example using one or more cameras or other optical sensors. As another example, the drone may include a microphone array that is configured to capture 3D sound for use during spatialized audio processing, as described herein.

Although the position predictor 104 and the processor 106 are described as separate components, in another particular implementation, the position predictor 104 may be part of the processor 106. For example, the processor 106 may include circuitry configured to perform the operations of the position predictor 104. Alternatively, the processor 106 may be configured to execute instructions to perform the operations of the position predictor 104. In a particular implementation, the position predictor 104 and the processor 106 may be integrated within a mobile device, such as a mobile telephone, a tablet computer, a laptop computer, a computerized watch (or other wearable device), a PDA, or a combination thereof, and the mobile device may be communicatively coupled to the audio device 102, such as a HMD, a headset, or another audio device. In this implementation, the mobile device may be configured to provide audio processing for the audio device 102, and the audio device 102 may be configured only to generate audio output(s) based on audio signal(s).

During operation, the user may turn on the audio device 102 and initiate playback of a particular audio file (or may stream content via a network). The one or more sensors 103 may generate the sensor data 110 and provide (e.g., transmit) the sensor data 110 to the position predictor 104. The sensor data 110 may include the coordinate data 120 and the orientation data 122. In some implementations, the audio device 102 may be worn on the user's head, and thus the sensor data 110 may represent the user's head. In other implementations, the audio device 102 is stable or fixed (e.g., the audio device is a speaker array) and the sensors 103 track the position and orientation of the user. In some examples, the sensor data 110 may indicate a translation position (e.g., x-y-z coordinates) and orientation (e.g., pitch, roll, and yaw) of the audio device 102, the user, or the user's head as the user reacts to presentation of the audio file or content. Additionally or alternatively, the sensor data 110 may indicate the position and orientation of the user in a virtual environment (or an AR environment).

The position predictor 104 may generate the predicted position data 112 based on the sensor data 110. For example, the position predictor 104 may predict a position of the audio device 102 (or the user) at a future time based on the sensor data 110 (e.g., the position data). The processor 106 may generate the output spatialized audio signal 114 based on the predicted position data 112, and may provide the output spatialized audio signal 114 (after 3D rendering and post-processing) to the audio device 102 for use in generating an audio output (e.g., an auditory sound). In various implementations, as described herein, determining the predicted position data 112 and generating the output spatialized audio signal 114 may involve accessing historical data, performing real time or near real time computations, determine a closest a previously computed trajectory, retrieving a previously computed spatialized audio signal, applying a rotation, etc. The audio output at the audio device 102 may enable a user to perceive a change in a direction or distance of a sound source due to the user's movements or predicted movements (in the real world or in the virtual or AR environment). Additionally or alternatively, the output spatialized audio signal 114 may be stored at a memory for subsequent retrieval and playback.

The audio processing device 100 of FIG. 1A may thus compensate for a delay (e.g., a latency) associated with generating spatialized audio signals by generating the output spatialized audio signal 114 based on the predicted position data 112. Because the processor 106 generates the output spatialized audio signal 114 based on the predicted position data 112 (e.g., data indicative of a position of the audio device 102 or the user at a future time) instead of position data indicative of a current position of the audio device 102 or the user, the latency is compensated for and a user may not perceive a lag between his or her movement and a corresponding change in a spatialized audio output.

Figure 1B:
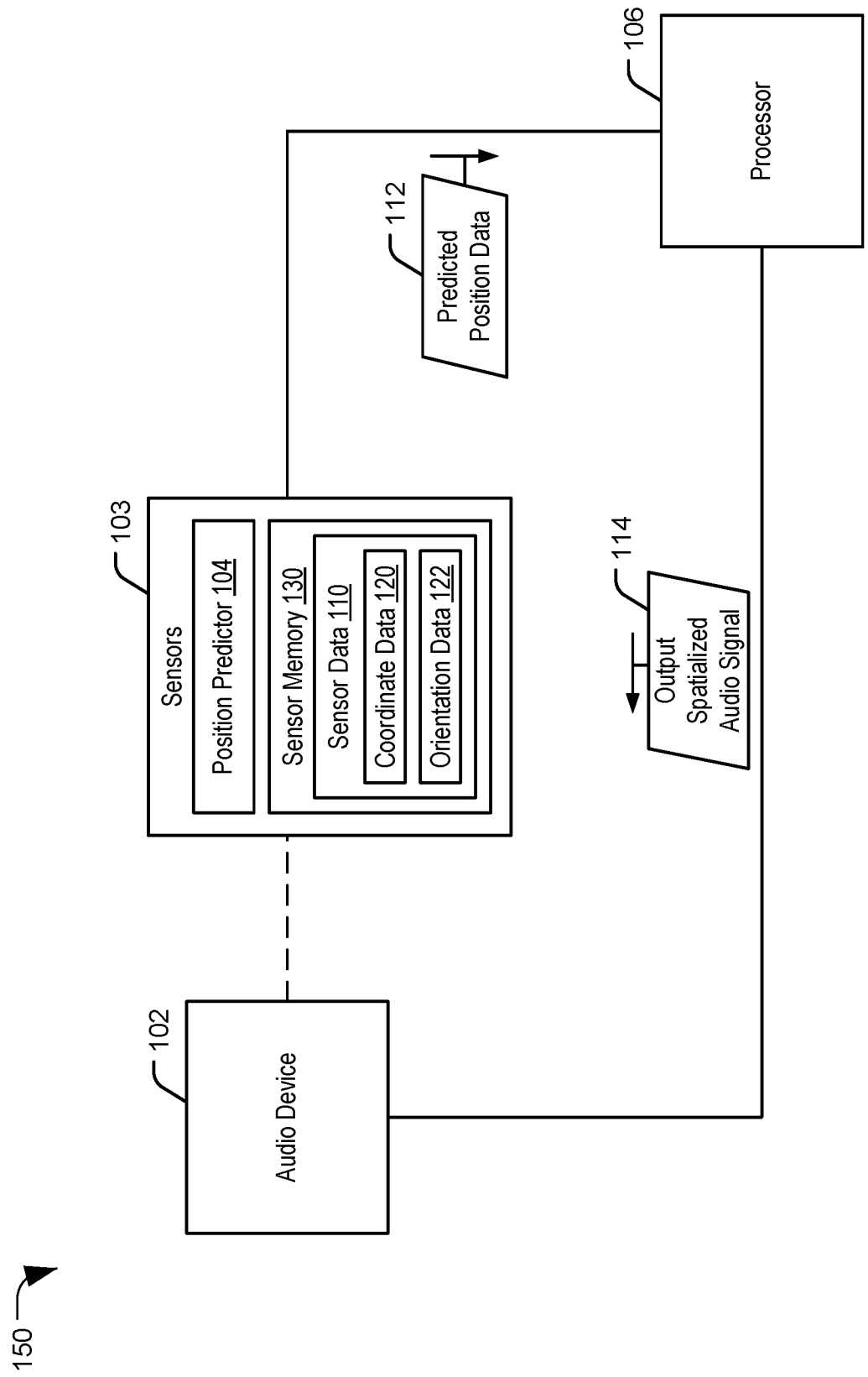
FIG. 1B is a block diagram of a second implementation of an audio processing device configured to generate an output spatialized audio signal based on predicted position data.

Referring to FIG. 1B, a second implementation of an audio processing device is shown and generally designated 150. The audio processing device 150 is configured to generate an output spatialized audio signal based on predicted position data. The audio processing device 150 includes the audio device 102, the one or more sensors 103, and the processor 106.

In the implementation illustrated in FIG. 1B, the sensors 103 include the position predictor 104. For example, the sensors 103 may include a sensor block or a sensor system that includes circuitry, such as the position predictor 104, that is configured to perform operations other than generating the sensor data 110. As another example, the sensors 103 (e.g., the sensor block or sensor system) may include a processor that is configured to perform the operations of the position predictor 104.

In a particular implementation, the sensors 103 may include a sensor memory 130. The sensor memory 130 may be configured to store data generated by the sensors 103, such as the sensor data 110 (e.g., the coordinate data 120 and the orientation data 122). The data may be accessible to the position predictor 104 for performing one or more operations, such as determining the predicted position data 112.

During operation, the sensors 103 may determine (e.g., measure) the sensor data 110, as described with reference to FIG. 1A. In a particular implementation, the sensor data 110 may be stored (e.g., at the sensor memory 130). The position predictor 104 may determine the predicted position data 112 based on the sensor data 110 (and historical position data), as further described with reference to FIG. 1A. The position predictor 104 may provide the predicted position data 112 to the processor 106. The processor 106 may receive the predicted position data 112 and generate the output spatialized audio signal 114 based on the predicted position data 112, as further described with reference to FIG. 1A.

The audio processing device 150 of FIG. 1B may thus compensate for a delay (e.g., a latency) associated with generating spatialized audio signals by generating the output spatialized audio signal 114 based on the predicted position data 112. Because the processor 106 generates the output spatialized audio signal 114 based on the predicted position data 112 (e.g., data indicative of a position of the audio device 102 or the user at a future time) instead of position data indicative of a current position of the audio device 102 or the user, the latency is compensated for and a user may not perceive a lag between his or her movement and a corresponding change in a spatialized audio output. Because the position predictor 104 is included in the sensors 103 in the implementation illustrated in FIG. 1B, an amount of operations performed at the processor 106 may be reduced as compared to other audio processing devices that process spatialized audio signals.

Figure 1C:
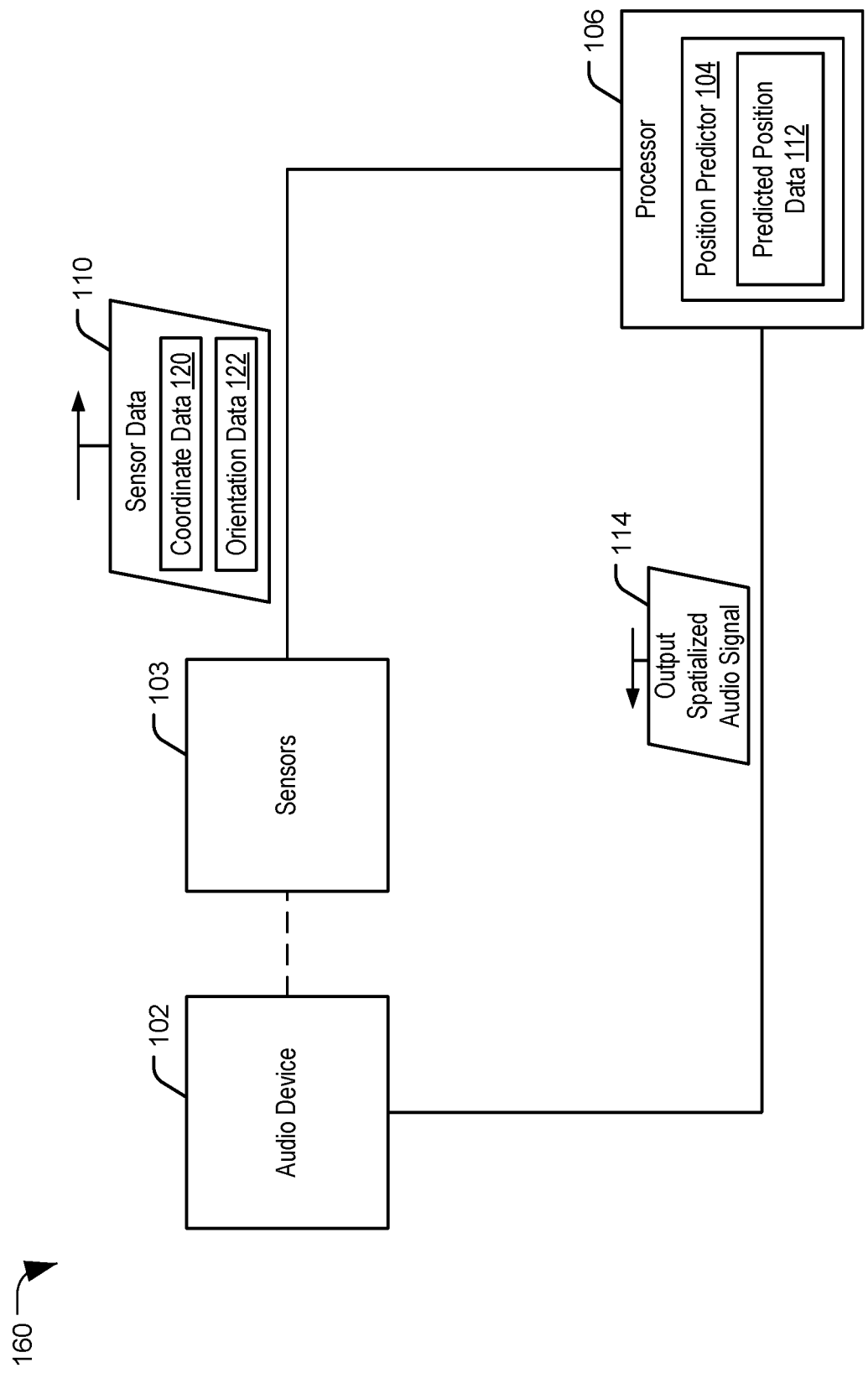
FIG. 1C is a block diagram of a third implementation of an audio processing device configured to generate an output spatialized audio signal based on predicted position data.

Referring to FIG. 1C, a third implementation of an audio processing device is shown and generally designated 160. The audio processing device 160 is configured to generate an output spatialized audio signal based on predicted position data. The audio processing device 160 includes the audio device 102, the one or more sensors 103, and the processor 106.

In the implementation illustrated in FIG. 1C, the processor 106 includes the position predictor 104. For example, the processor 106 may include circuitry or other hardware that is configured to perform operations described with reference to the position predictor 104. As another example, the processor 106 may execute one or more instructions stored on a non-transitory computer readable medium that cause the processor 106 to perform the operations of the position predictor 104.

During operation, the sensors 103 may determine (e.g., measure) the sensor data 110, as described with reference to FIG. 1A. The processor 106 may receive the sensor data 110 from the sensors 103. The position predictor 104 (e.g., the processor 106) may determine the predicted position data 112 based on the sensor data 110 (and historical position data), as further described with reference to FIG. 1A. For example, the processor 106 may perform one or more operations to determine the predicted position data 112. In a particular implementation, the processor 106 may cause the predicted position data 112 to be stored (e.g., in a memory accessible to the processor 106). Additionally, the processor 106 may generate the output spatialized audio signal 114 based on the predicted position data 112, as further described with reference to FIG. 1A.

The audio processing device 160 of FIG. 1C may thus compensate for a delay (e.g., a latency) associated with generating spatialized audio signals by generating the output spatialized audio signal 114 based on the predicted position data 112. Because the processor 106 generates the output spatialized audio signal 114 based on the predicted position data 112 (e.g., data indicative of a position of the audio device 102 or the user at a future time) instead of position data indicative of a current position of the audio device 102 or the user, the latency is compensated for and a user may not perceive a lag between his or her movement and a corresponding change in a spatialized audio output. Because the position predictor 104 is included in the processor 106 in the implementation illustrated in FIG. 1C, an amount of components in the audio processing device 160 may be reduced as compared to other audio processing devices that process spatialized audio signals.

In the above description, various functions performed by the audio processing device 100 of FIG. 1A, the audio processing device 150 of FIG. 1B, and the audio processing device 160 of FIG. 1C are described as being performed by certain components. However, this division of components is for illustration only. In an alternate implementation, a function performed by a particular component may instead be divided amongst multiple components. Moreover, in an alternate implementation, two or more components of FIGS. 1A-C may be integrated into a single component. For example, the position predictor 104 and the processor 106 may be integrated in a single component. Alternatively, the audio device 102, the position predictor 104, and the processor 106 may be integrated in a single component. Each component illustrated in FIGS. 1A-C may be implemented using hardware (e.g., a field-programmable gate array (FPGA) device, an application-specific integrated circuit (ASIC), a DSP, a controller, etc.), software (e.g., instructions executable by a processor), or a combination thereof.

Figure 2:
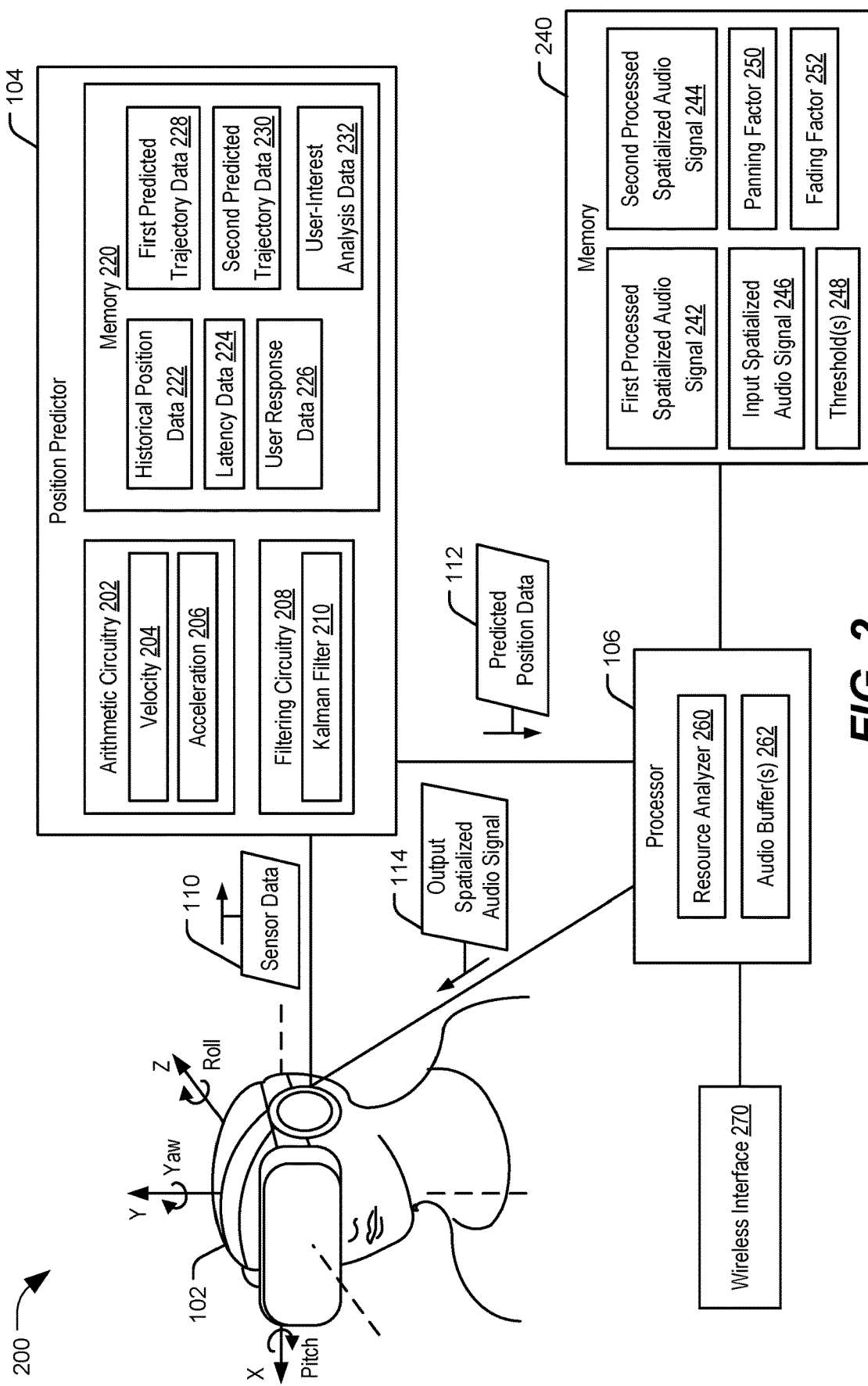
FIG. 2 is a block diagram of an illustrative implementation of an audio processing device that includes or is coupled to a head mounted display of a virtual reality system.

Referring to FIG. 2, an illustrative implementation of an audio processing device that includes or is coupled to a HMD of a virtual reality system is shown and generally designated 200. The audio processing device 200 includes the audio device 102, the position predictor 104, the processor 106, a memory 240, and a wireless interface 270. In FIG. 2, the audio device 102 is illustrated as a HMD of a virtual reality system. In other implementations, the audio device 102 may be a headset or another device capable of outputting 3D rendered audio signals. Although the position predictor 104, the processor 106, and the memory 240 are illustrated as being separate from the audio device 102, in other implementations, the position predictor 104, the processor 106, the memory 240, or a combination thereof, may be integrated within the audio device 102. For example, the position predictor 104, the processor 106, and the memory 240 may be integrated within the virtual reality system. Alternatively, the audio device 102 may be a headset, and the illustrated HMD may be a pair of virtual reality goggles that are communicatively coupleable to a mobile device, such as a mobile telephone or tablet computer, that is configured to provide visual and audio outputs. In this implementation, the position predictor 104, the processor 106, the memory 240, or a combination thereof, may be integrated within the mobile device. In another alternate implementation, the audio device 102 may be a speaker array, as described with reference to FIGS. 1A-C, and the sensor data 110 may be provided by sensors that are separate from the speaker array (or that are configured to track the position and the orientation of the user, not the audio device 102).

The position predictor 104 includes arithmetic circuitry 202, filtering circuitry 208, and a memory 220. The processor 106 includes a resource analyzer 260 and one or more audio buffers 262. Although illustrated as separate (e.g., distinct) components, in other implementations the memory 220 and the memory 240 may be a single memory that is accessible to both the position predictor 104 and the processor 106. Additionally or alternatively, although the memory 220 is illustrated as integrated within (or on the same chip as) the position predictor 104 and the memory 240 is illustrated as a separate device from the processor 106, in other implementations, the memory 220 may be a separate device from the position predictor 104, the memory 240 may be integrated within (or on the same chip as) the processor 106.

The memory 220 may be configured to store historical position data 222, latency data 224, user response data 226, first predicted trajectory data 228, second predicted trajectory data 230, and user-interest analysis data 232. The historical position data 222 may represent previous sensor data received from the audio device 102 (e.g., from the one or more sensors 103). The latency data 224 may indicate a latency associated with processing spatialized audio signals at the processor 106. In a particular implementation, the position predictor 104 is configured to determine the latency data 224 by performing one or more measurements of operations of the processor 106. In an alternate implementation, the processor 106 determines the latency data 224 and provides the latency data 224 to the position predictor 104. The user response data 226 may indicate responses of the user, or other users, to presentation of one or more spatialized audio signals. For example, the user response data 226 may indicate a trajectory of the audio device 102 (e.g., of the user's head) during a previous presentation of a particular spatialized audio signal. The user-interest analysis data 232 may indicate interest levels of the user associated with presentations of related or similar spatialized audio signals. For example, the user-interest analysis data 232 may indicate a likelihood of a user to turn away from a loud sound, or to turn toward a particular sound (e.g., a sound of a car starting, a sound of an explosion, etc.) during presentation of a spatialized audio signal. Additionally or alternatively, the user-interest analysis data 232 may indicate interest levels of the user to various topics. For example, the user-interest analysis data 232 may indicate that the user prefers listening to concerts rather than viewing movies, that the user prefers watching action movies rather than documentaries, or that the user prefers educational virtual reality content rather than sports games, as non-limiting examples.

The memory 220 may also store a plurality of predicted trajectory data, such as the first predicted trajectory data 228 and the second predicted trajectory data 230, which may be used by the position predictor 104 (or the processor 106) to select processed spatialized audio signals for retrieval from the memory 240, as further described herein. Additionally or alternatively, the predicted trajectory data 228, 230 may be received (e.g., accessed) from at least one other device. To illustrate, the audio processing device 200 may be configured to receive one or more streams (e.g., data streams, media streams, etc.) from at least one device, such as a server, via the wireless interface 270. As non-limiting examples, the at least one device may include a multimedia server, a cloud-based storage device, or another mobile device that is accessible via wireless communications. The processor 106 may be configured to send a request for predicted trajectory data, processed spatialized audio signals, or both, to the at least one other device via the wireless interface 270, and the audio processing device 200 may receive at least one data stream from the at least one device responsive to sending the request.

As described with reference to FIGS. 1A-C, the position predictor 104 may be configured to determine the predicted position data 112 based on the sensor data 110. The sensor data 110 may include the coordinate data 120 and the orientation data 122 of FIGS. 1A-C. As illustrated in FIG. 2, the coordinate data 120 may include x-y-z coordinates (e.g., translational position data) that indicate a translational position of the user (or the audio device 102). In some examples, the translational position of the user may be relative to a fixed origin, such as the center of a room or a virtual reality environment, the position of the user when playback of a file or streaming of content began, etc. Additionally, the orientation data 122 may include angles of roll, pitch, and yaw, which indicate orientation of the user (or the audio device 102) with respect to the coordinate planes. In some examples, the orientation angles may be relative to a fixed origin, such as the origin of a gyro sensor. Thus, in at least some implementations, the sensor data includes six measurements (e.g., an x coordinate value, a y coordinate value, a z coordinate value, a roll angle, a pitch angle, and a yaw angle). In other implementations, one or more of the six measurements are not included in the sensor data 110, or the sensor data 110 includes additional measurements, such as movement, angular momentum, velocity, acceleration, or others. In other implementations, the sensor data 110 indicates a position of the user in a virtual environment or an AR environment. For example, a control interface may be coupled to the VR system, and the control interface may include sensors that generate the sensor data based on user inputs. The user inputs may include pressing a button or pad on a hand-held controller, a voice input, a touch input, a gesture input, or another kind of user input.

In some examples, the predicted position data 112 may be determined further based on the historical position data 222, where the historical position data 222 corresponds to previous movements by the user wearing the illustrated HMD, previous movements by other users, or both. The position predictor 104 may include the arithmetic circuitry 202 that is configured to perform one or more mathematical operations to determine the predicted position data 112. For example, the arithmetic circuitry 202 may include one or more adders, multipliers, logic gates, shifters, or other circuitry to enable the position predictor 104 to perform computations to determine the predicted position data 112. As a particular example, the position predictor 104 may use the arithmetic circuitry 202 to perform one or more computations to compare the sensor data 110 to the historical position data 222. A difference between the sensor data 110 and the historical position data 222 may be used to estimate a predicted position at a future time (e.g., the predicted position data 112).

Additionally, the arithmetic circuitry 202 may be configured to perform operations to determine a velocity 204, an acceleration 206, or both, based on the sensor data 110 and the historical position data 222. In other implementations, the velocity 204, the acceleration 206, or both may be determined by the one or more sensors 103 and may be provided to the position predictor 104 (e.g., as part of the sensor data 110). The predicted position data 112 may be determined based on the velocity 204, the acceleration 206, or both. As one example, the velocity 204 may be multiplied by the latency data 224 to determine a predicted movement, and the predicted movement may be applied to a current position (indicated by the sensor data 110) to determine a predicted position indicated by the predicted position data 112.

In some implementations, the position predictor 104 may use the filtering circuitry 208 to determine the predicted position data 112. In a particular implementation, the filtering circuitry 208 includes a Kalman filter 210, and the Kalman filter 210 is applied to the sensor data 110 (e.g., the current position) to determine the predicted position data 112. In another particular implementation, the velocity 204 may be used as an additional input to the Kalman filter 210. In other implementations, the filtering circuitry 208 may include particle filter(s) or a particle filter tracker. The particle filter may determine one or more predicted trajectories based on the sensor data 110, and the one or more predicted trajectories may be indicated by the predicted position data 112. For each of the one or more predicted trajectories, the processor 106 may generate (or retrieve) a spatialized audio signal, and the output spatialized audio signal 114 may be selected as the spatialized audio signal corresponding to trajectory that is closest to a position at the time the spatialized audio signals are finished being processed.

As described with reference to FIGS. 1A-C, the position predictor 104 may be configured to determine a predicted trajectory based on the sensor data 110. The predicted trajectory may be based on an analysis of the user response data 226, the user-interest analysis data 232, or both, and the sensor data 110. To illustrate, the position predictor 104 may determine multiple predicted trajectories, such as predicted trajectories indicated by the first predicted trajectory data 228 and the second predicted trajectory data 230. The predicted trajectories may be determined based on the user response data 226. For example, the user response data 226 may include position data or orientation data that is temporally synchronized to indicate responses (e.g., movements) of the user during other presentations of a spatialized audio signal, and the multiple predicted trajectories may be determined based on the responses. Additionally or alternatively, the predicted trajectories may be determined based on the user-interest analysis data 232. For example, the position predictor 104 may access the user-interest analysis data 232 to determine that a particular sound in a spatialized audio signal will be of interest to the user, and the position predictor 104 may determine one or more predicted trajectories based on this analysis.

The predicted trajectory data 228, 230 may be generated prior to playback of a particular spatialized audio file and may be accessed during the playback to determine the predicted trajectory. For example, the position predictor 104 may determine a predicted trajectory by comparing the sensor data 110 and the historical position data 222 to the stored predicted trajectory data (or to predicted trajectory data accessed via the wireless interface 270) to determine which predicted trajectory most closely matches the sensor data 110 and the historical position data 222. The closest matching predicted trajectory stored at the memory 220 (or accessed via the wireless interface 270) may be selected as the predicted trajectory to be indicated by the predicted position data 112. For example, in response to determining that the first predicted trajectory data 228 is the closest match to the sensor data 110 and the historical position data 222, the position predictor 104 may output the first predicted trajectory data 228 (indicating the first predicted trajectory) as the predicted position data 112. In another particular implementation, the sensor data 110 and the historical position data 222 may be insufficient to determine a predicted trajectory, and the position predictor 104 may output trajectory data corresponding to a most likely trajectory that is determined based on the user response data 226, the user-interest analysis data 232, or both.

The processor 106 may be configured to receive the predicted position data 112 and to generate the output spatialized audio signal 114 based on the predicted position data 112, as described with reference to FIGS. 1A-C. In a particular implementation, the processor 106 is configured to process an input spatialized audio signal 246 based on the predicted position data 112 to generate the output spatialized audio signal 114. To illustrate, the processor 106 may generate a rotation (e.g., rotation data) based on the predicted position data 112. In a particular implementation, the rotation may be indicated by a rotation matrix, as further described with reference to FIG. 4. The processor 106 may apply the rotation to the input spatialized audio signal 246 to "rotate" the input spatialized audio signal 246 such that a perceived direction or distance of one or more sounds changes based on the predicted position data 112. In other implementations, other processing may be performed to generate (e.g., determine) and apply the rotation. In other implementations, the processor 106 may perform channel-based audio processing, object-based audio processing, or other audio processing (such as vector based amplitude panning (VBAP), as a non-limiting example) to modify the input spatialized audio signal 246 such that a perceived direction or distance of one or more sounds changes based on the predicted position data 112. The processor 106 may be configured to store processed frames of the input spatialized audio signal 246 in the audio buffers 262, and to provide the processed frames from the audio buffers 262 to the audio device 102 as the output spatialized audio signal 114.

In another particular implementation, the processor 106 may be configured to determine a predicted trajectory based on the predicted position data 112 and to retrieve, from the memory 240, a processed spatialized audio signal that corresponds to the predicted trajectory. To illustrate, the memory 240 may be configured to store a plurality of processed spatialized audio signals based on a plurality of predicted trajectories. For example, the memory 240 may store a first processed spatialized audio signal 242 that is based on a first predicted trajectory and a second processed spatialized audio signal 244 that is based on a second predicted trajectory. The processed spatialized audio signals may be generated prior to receiving a request for playback of spatialized audio signals. For example, the processed audio signals may be stored at the memory 240 during an initial setup process of the audio processing device 200, during an update of the audio processing device 200, or during a time when processing resources are available to generate and store the processed spatialized audio files. As additional examples, the processed spatialized audio files may be requested from another device (e.g., a server) periodically or as-needed, the spatialized audio files may be received via one or more data streams received via the wireless interface 270 and stored at the memory 240, the spatialized audio files may be downloaded or stored by a user, the spatialized audio files may be stored as part of other content (e.g., movies, video games, etc.) that is stored by a user or as part of an automatic update.

The predicted position data 112 may indicate the predicted trajectory, and the processor 106 may access the memory 240 and retrieve a processed spatialized audio signal that corresponds to the predicted trajectory. For example, in response to determining that the first predicted trajectory (that is associated with the first processed spatialized audio signal 242) corresponds to the predicted trajectory that is indicated by the predicted position data 112, the processor 106 may retrieve the first processed spatialized audio signal 242 from the memory 240 and may use the first processed spatialized audio signal as the output spatialized audio signal 114. To further illustrate, frames of the first processed spatialized audio signal 242 may be retrieved from the memory 240 and stored in the audio buffers 262, and the frames may be provided from the audio buffers 262 to the audio device 102 as the output spatialized audio signal 114.

In another particular implementation, the position predictor 104 may update the predicted position data 112 to indicate a different predicted trajectory based on changes in the sensor data 110 (e.g., the position data). To illustrate, at time t0, the predicted position data 112 may indicate a first predicted trajectory based on the sensor data 110. At time t1, the position predictor 104 may determine that sensor data associated with time t1 indicates that a second predicted trajectory is the closest match to a current user trajectory. At time t1, the position predictor 104 may provide (e.g., transmit) second predicted position data to the processor 106. The second predicted position data may indicate the second predicted trajectory. In response to receiving the second predicted position data that indicates the second predicted trajectory, the processor 106 may retrieve the second processed spatialized audio signal 244 that corresponds to the second predicted trajectory.

At time t0, the processor 106 may store frames of the first processed spatialized audio signal 242 in the audio buffers 262 and the frames may be provided from the audio buffers 262 to the audio device 102 as the output spatialized audio signal 114. At time t1, in response to receiving the second predicted position data, the processor 106 may begin storing frames from the first processed spatialized audio signal 242 and the second processed spatialized audio signal 244 in the audio buffers 262. Output data corresponding to the frames from the two processed spatialized audio signals may be stored in the audio buffers 262 based on a fading factor 252 stored at the memory 240, according to the following equation:

$$\text{Output data}=a*L1R1+(1-a)*L2R2 \qquad \text{Equation 1}$$

where a represents the fading factor, L1R1 represents a stream corresponding to a first processed spatialized audio signal (e.g., the first processed spatialized audio signal 242), and L2R2 represents a stream corresponding to a second processed spatialized audio signal (e.g., the second processed spatialized audio signal 244). The fading factor 252 a may be a fade-in/fade-out function that transitions from 0 to 1 during a transition time. In a particular implementation, the fading factor 252 corresponds to a linear function. In another particular implementation, the fading factor 252 corresponds to a non-linear function. The transition time may be determined based on a tradeoff between system responsiveness (e.g., how quickly the system should change audio streams based on user movement) and audio smoothness (e.g., avoiding outputting audible audio artifacts). The transition time may be on the order of tens of milliseconds. In a particular implementation, the transition time is 10 ms.

In another particular implementation, transitions between two processed spatialized audio signals may be limited to times when the corresponding predicted trajectories overlap. For example, if the first predicted trajectory and the second predicted trajectory overlap at time t2, the processor 106 may switch from storing frames of the first processed spatialized audio signal 242 in the audio buffers 262 to storing frames of the second processed spatialized audio signal 244 in the audio buffers 262 at time t2. Limiting transitions between different processed spatialized audio signals to times when the predicted trajectories overlap may reduce audio artifacts caused by differences between the processed spatialized audio signals.

In another particular implementation, the processor 106 may be configured to pan between two processed spatialized audio signals to achieve a closer match to a position of the audio device 102 (or the user). In this implementation, the position predictor 104 may provide the predicted position data 112 indicating multiple closest matching predicted trajectories. For example, in response to determining that the first predicted trajectory and the second predicted trajectory are the closest matches to the sensor data 110, the position predictor 104 may include the first predicted trajectory data 228 and the second predicted trajectory data 230 in the predicted position data 112. In response to the predicted position data 112 including the first predicted trajectory data 228 and the second predicted trajectory data 230, the processor 106 may retrieve the first processed spatialized audio signal 242 (corresponding to the first predicted trajectory) and the second processed spatialized audio signal 244 (corresponding to the second predicted trajectory) from the memory 240.

Output data corresponding to the frames from the two processed spatialized audio signals may be stored in the audio buffers 262 based on a panning factor 250 stored at the memory 240, according to the following equation:

$$\text{Output data} = b*L1R1 + (1-b)*L2R2 \quad \text{Equation 2}$$

where b represents the panning factor, L1R1 represents a stream corresponding to a first processed spatialized audio signal (e.g., the first processed spatialized audio signal 242), and L2R2 represents a stream corresponding to a second processed spatialized audio signal (e.g., the second processed spatialized audio signal 244). The panning factor 250 may be defined by the following equation:

$$b = |(P(t)-P1)|/|P1-P2| \quad \text{Equation 3}$$

where P(t) represents a current position (based on the sensor data 110), P1 represents a corresponding positions from the first predicted trajectory, and P2 represents a corresponding predicted trajectory from the second predicted trajectory. Thus, audio frames from multiple spatialized audio signals may be stored in the audio buffers 262 based on the panning factor 250, and the audio frames may be provided from the audio buffers 262 to the audio device 102 as the output spatialized audio signal 114.

In a particular implementation, the processor 106 includes the resource analyzer 260. The resource analyzer 260 may be configured to analyze available processing resources to determine an operating mode of the audio processing device 200. For example, based on available processing resources, the resource analyzer may determine whether the processor 106 processes spatialized audio signals in real time (or near real time) or whether the processor 106 retrieves processed spatialized audio signals from the memory 240. To illustrate, the resource analyzer 260 may be configured to compare available resources to one or more thresholds 248 stored at the memory 240. The threshold(s) 248 may be represented in terms of processor utilization, available memory, battery charge level, etc. The threshold(s) 248 may be fixed or may be adjustable (e.g., based on user input, based on programming by a vendor of the HMD, etc.). In response to determining that the available resources exceed the threshold(s) 248 (e.g., based on the comparison), the resource analyzer 260 may determine that the audio processing device 200 (e.g., the position predictor 104 and the processor 106) is to process spatialized audio signals in real time (or near real time). Accordingly, the resource analyzer 260 may generate a first control signal that causes the processor 106 to process spatialized audio signals, such as the input spatialized audio signal 246, to generate the output spatialized audio signal 114. In response to determining that the available resources fail to exceed (e.g., are less than or equal to) the threshold(s) 248, the resource analyzer 260 may determine that the audio processing device 200 (e.g., the position predictor 104 and the processor 106) is to use processed spatialized audio signals stored at the memory 240 instead of processing spatialized audio signals in real time. Accordingly, the resource analyzer 260 may generate a second control signal that causes the processor 106 to retrieve processed spatialized audio signals stored at the memory 240 based on the predicted position data 112. In some implementations, the resource analyzer 260 may be configured to periodically perform the determination as the available processing resources may change at different times. In other implementations, the processor 106 does not include the resource analyzer 260, and the audio processing device 200 does not switch between operating modes (e.g., between processing spatialized audio signals in real time or retrieving processed spatialized audio signals stored at the memory 240).

During operation, the position predictor 104 receives the sensor data 110 from the sensors 103. The sensor data 110 indicates a position and an orientation of the audio device 102 (e.g., of the user's head). Additionally or alternatively, the sensor data 110 indicates a position and an orientation of the user in a virtual or AR environment. The position predictor 104 determines the predicted position data 112 based on the sensor data 110. For example, the arithmetic circuitry 202 may perform one or more operations to determine the predicted position data 112. The predicted position data 112 may be provided to the processor 106, and the processor 106 may generate the output spatialized audio signal 114 based on the predicted position data 112. The output spatialized audio signal 114 may be provided to the audio device 102 to initiate an audio output at the audio device 102. Additionally or alternatively, the output spatialized audio signal 114 may be stored at the memory 240.

In a particular implementation, the processor 106 may process the input spatialized audio signal 246 based on the predicted position data 112 to generate the output spatialized audio signal 114. In another particular implementation, the processor 106 may retrieve a processed spatialized audio signal from the memory 240 based on a predicted trajectory indicated by the predicted position data 112. In another particular implementation, the operation mode of the audio processing device 200 (e.g., whether a spatialized audio signal is processed in real time or whether a processed spatialized audio signal is retrieved from the memory 240) may be determined by the resource analyzer 260 by comparing available processing resources to the threshold(s) 248.

The audio processing device 200 of FIG. 2 may thus compensate for a delay (e.g., a latency) associated with generating spatialized audio signals by generating the output spatialized audio signal 114 based on the predicted position data 112. Because the processor 106 generates the output spatialized audio signal 114 based on the predicted position data 112 (e.g., data indicative of a position of the audio device 102 or the user at a future time) instead of position data indicative of a current position of the audio device 102 or the user, the latency is compensated for and a user does not experience a lag between his or her movement and a corresponding change in a spatialized audio output. Additionally, if available computing resources are insufficient (e.g., less than or equal to the threshold(s) 248), the processor 106 may retrieve processed spatialized audio signals from the memory 240 instead of processing spatialized audio signals in real time. Using pre-processed spatialized audio signals may reduce a load on the processor 106 as compared to processing spatialized audio signals in real time while continuing to approximate spatialized audio output for an individual user's movements.

In the above description, various functions performed by the audio processing device 200 of FIG. 2 are described as being performed by certain components. However, this division of components is for illustration only. In an alternate implementation, a function performed by a particular component may instead be divided amongst multiple components. Moreover, in an alternate implementation, two or more components of FIG. 2 may be integrated into a single component. For example, the position predictor 104, the processor 106, and the memory 240 may be integrated in a single component. Alternatively, the audio device 102, the position predictor 104, the processor 106, and the memory 240 may be integrated in a single component. Each component illustrated in FIG. 2 may be implemented using hardware (e.g., a field-programmable gate array (FPGA) device, an application-specific integrated circuit (ASIC), a DSP, a controller, etc.), software (e.g., instructions executable by a processor), or a combination thereof.

Figure 3:
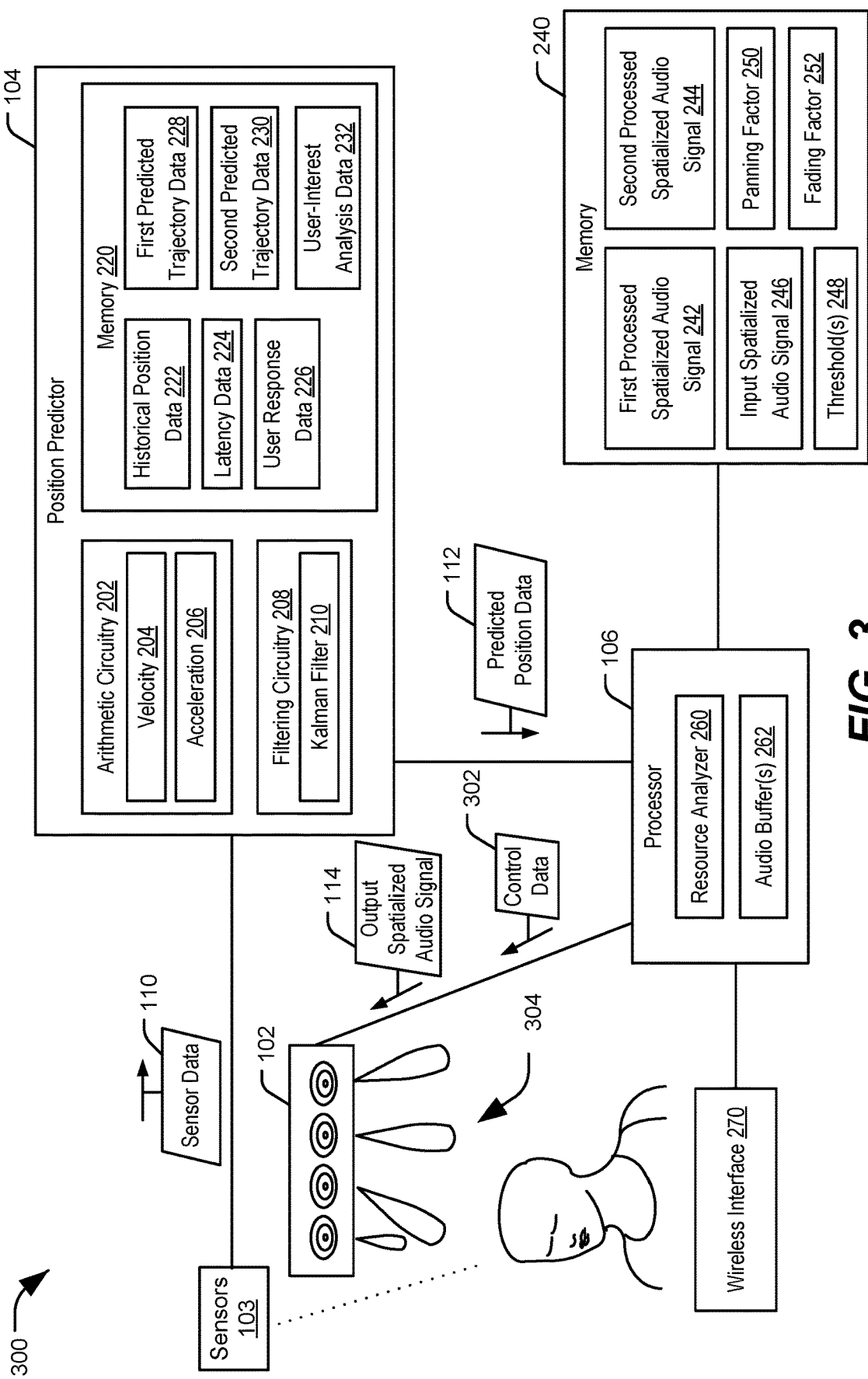
FIG. 3 is a block diagram of an illustrative implementation of an audio processing device that includes or is coupled to a speaker array.

Referring to FIG. 3, an illustrative implementation of an audio processing device that includes or is coupled to a speaker array is shown and generally designated 300. The audio processing device 300 includes the audio device 102, the sensors 103, the position predictor 104, the processor 106, the memory 240, and the wireless interface 270. In the implementation illustrated in FIG. 3, the audio device 102 includes a speaker array, and the sensors 103 are separate from the audio device 102 and configured to determine a position and an orientation of the user. For example, the sensors 103 may include a camera or other optical device configured to determine the position and the orientation of the user. In another particular implementation, the sensors 103 may be other movement sensors, such as position sensors, accelerometers, orientation sensors, etc., that are worn by (e.g., coupled to) the user. In another particular implementation, the sensors 103 may be integrated within a user interface device, and the sensor data 110 may indicate a position and an orientation of the user in a virtual or AR environment.

The audio processing device 300 may be configured to operate similarly to the audio processing device 200 of FIG. 2. For example, the position predictor 104 may determine the predicted position data 112 based on the sensor data 110, and the processor 106 may generate the output spatialized audio signal 114 based on the predicted position data 112. The audio device 102 may be configured to perform beamforming (e.g., to generate audio outputs 304, such as audio waves, that are directed in particular directions) based on the output spatialized audio signal 114. For example, the audio device 102 may include one or more audio amplifiers and one or more audio filters configured to implement beamforming to direct audio waves (e.g., audio outputs) in particular directions. In this implementation, the audio device 102 (e.g., the audio filters) may be configured to direct the audio output (e.g., the audio waves) in particular directions based on spatialized audio signals. In some implementations, the processor 106 may be further configured to generate control signals 302 to enable the audio device 102 (e.g., the speaker array) to perform the beamforming. For example, the control signals 302 may include one or more filter coefficients used by the audio filters of the audio device 102 to perform the beamforming.

The audio processing device 300 of FIG. 3 may compensate for a delay (e.g., a latency) associated with generating spatialized audio signals by generating the output spatialized audio signal 114 based on the predicted position data 112. Additionally, the audio processing device 300 may enable a speaker array (e.g., the audio device 102) to perform beamforming to output the output spatialized audio signal 114. Thus, the techniques of the present disclosure may improve a spatialized audio listening experience associated with binaural headphone output as well as multi-channel speaker output.

In the above description, various functions performed by the audio processing device 300 of FIG. 3 are described as being performed by certain components. However, this division of components is for illustration only. In an alternate implementation, a function performed by a particular component may instead be divided amongst multiple components. Moreover, in an alternate implementation, two or more components of FIG. 3 may be integrated into a single component. For example, the position predictor 104, the processor 106, and the memory 240 may be integrated in a single component. Alternatively, the audio device 102, the position predictor 104, the processor 106, and the memory 240 may be integrated in a single component. Each component illustrated in FIG. 3 may be implemented using hardware (e.g., a field-programmable gate array (FPGA) device, an application-specific integrated circuit (ASIC), a DSP, a controller, etc.), software (e.g., instructions executable by a processor), or a combination thereof.

Figure 4:
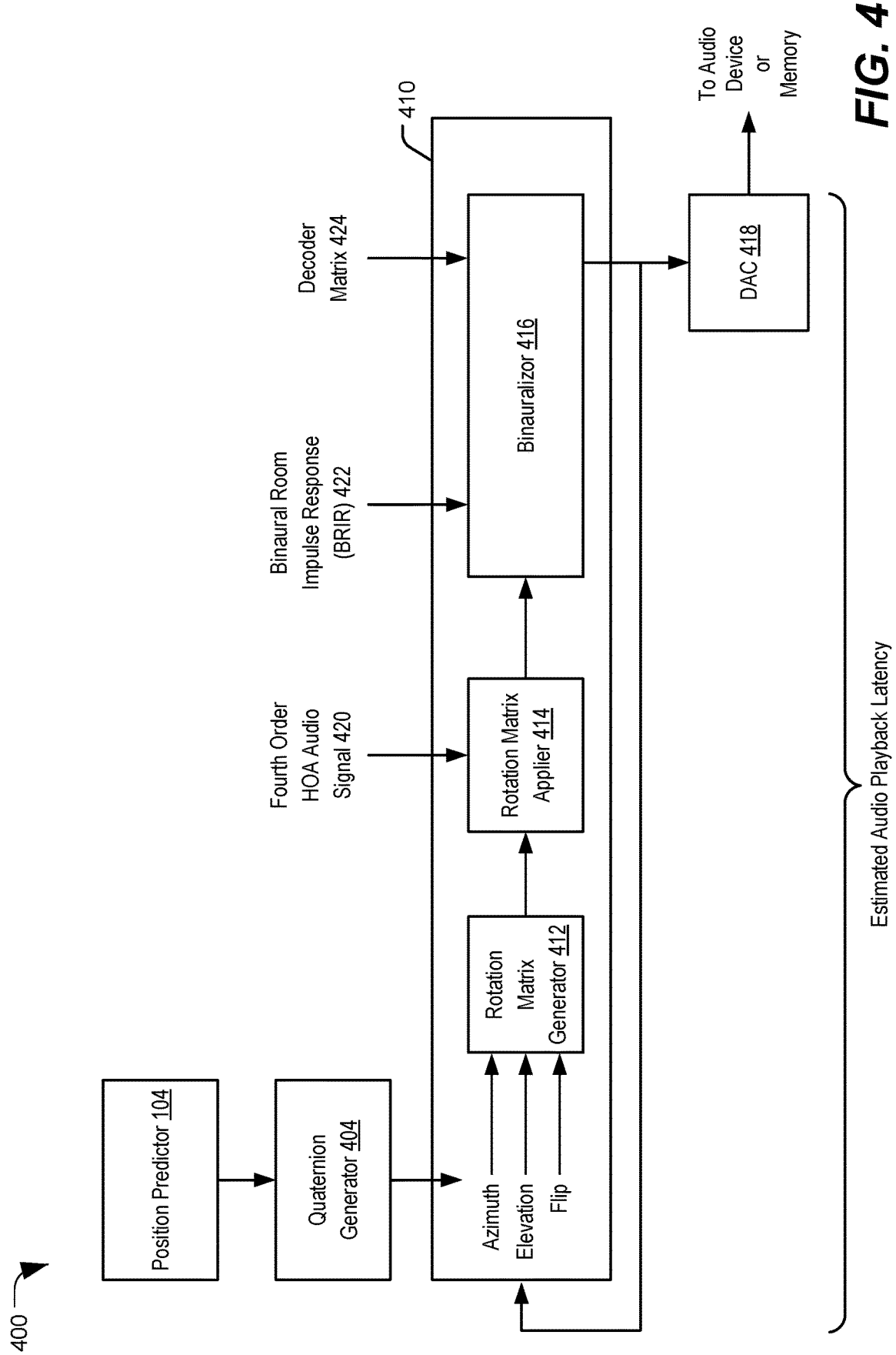
FIG. 4 is a block diagram of an illustrative implementation of an audio processing device configured to perform audio spatialization using predicted position data.

Referring to FIG. 4, an illustrative implementation of an audio processing device configured to perform audio spatialization using predicted position data is shown and generally designated 400. The audio processing device 400 includes the position predictor 104, a quaternion generator 404, audio spatialization circuitry 410, and a digital-to-analog converter (DAC) 418, with respective inputs and outputs coupled as shown. The audio spatialization circuitry 410 includes a rotation matrix generator 412, a rotation matrix applier 414, and a binauralizor 416, with respective inputs and outputs coupled as shown.

The position predictor 104 may be configured to determine predicted position data, such as the predicted position data 112 of FIGS. 1A-C, 2 and 3. The quaternion generator 404 may be configured to receive the predicted position data from the position predictor 104 and to generate quaternion data based on the predicted position data. The quaternion data may represent predicted position data in a quaternion format. In some implementations, the quaternion data may indicate an azimuth, an elevation, and a flip associated with the predicted position data. Alternatively, the quaternion data may be used to determine the azimuth, the elevation, and the flip using known equations.

The rotation matrix generator 412 may be configured to receive the quaternion data from the quaternion generator 404 and to generate a rotation matrix based on the quaternion data. Although FIG. 4 illustrates that the rotation matrix generator 412 receives the azimuth, the elevation, and the flip individually, such illustration is for convenience and is not to be considered limiting. In some implementations, a portion of the audio spatialization circuitry 410 may receive the quaternion data and generate the azimuth, the elevation, and the flip. Alternatively, the rotation matrix generator 412 may receive the quaternion data and may generate the azimuth, the elevation, and the flip. Generating the rotation matrix may include converting the quaternion data to spherical or Cartesian coordinates, rotating the coordinates, applying Eigen microphone (mic) weights, applying higher order ambisonic (HOA) ordering, and inverting coordinates.

The rotation matrix applier 414 may be configured to receive the rotation matrix from the rotation matrix generator 412. The rotation matrix applier 414 may be further configured to apply the rotation matrix to a fourth order HOA audio signal 420 to generate audio data. Applying the rotation matrix to the fourth order HOA audio signal 420 may cause a perceived direction or distance of a sound (or sound source) to change. In other implementations, the HOA audio signal may be lower than or higher than the fourth order. Applying the rotation matrix may include multiplying the rotation matrix by a vector of samples of the fourth order HOA audio signal 420. In some implementations, applying the rotation matrix, or performing addition processing, also accounts for changes in position. For example, x-y-z coordinate data may be weighted to compensate for changes in position.

The rotation matrix generator 412 and the rotation matrix applier 414 may be optional. In other implementations, the audio spatialization circuitry 410 may include other components configured to apply a rotation to a spatialized audio signal. For example, the audio spatialization circuitry 410 may include a vector generator, a vector applier, a rotation data set generator, a rotation data set applier, or other circuitry or hardware configured to determine rotation data (e.g., one or more vectors, one or more elements of a data set, one or more elements from a lookup table or database, etc.) and to apply the rotation data to input spatialized audio signals, such as the fourth order HOA audio signal 420, to perform audio spatialization processing.

The binauralizer 416 may be configured to perform binauralization on the audio data based on a binaural room impulse response (BRIR) 422 and a decoder matrix 424 to generate a digital spatialized audio signal. Performing binauralization may include convolving the audio data (e.g., the rotated audio samples) with BRIRs (or head related transfer functions (HRTFs)) and decoder matrices. In a particular implementation where the audio device 102 is a headset or a HMD of a virtual reality system, binauralization may include generating a decoder matrix for each ear (e.g., a left decoder matrix and a right decoder matrix) based on the decoder matrix 424, applying the BRIR 422 to the left decoder matrix and the right decoder matrix to generate BRIR decoder matrices, performing fast Fourier transforms (FFTs) on the BRIR decoder matrices, applying the FFT BRIR decoder matrices to the audio data (e.g., the rotated audio samples generated by the rotation matrix applier 414), performing overlapping addition of the decoded samples, and summing the results over multiple channels. In other implementations, the binauralizer 416 is not included, such as implementations associated with speaker arrays. Additionally or alternatively, one or more other components may be included, such as a filter coefficient generator that generates filter coefficients for use in performing beamforming.

The DAC 418 may be configured to receive the digital spatialized audio signal (e.g., the output of the binauralizor 416) and to convert the digital spatialized audio signal to an analog spatialized audio signal. The analog spatialized audio signal may be stored at the memory 240 or may be provided to the audio device 102 to generate an audio output, as described with reference to FIGS. 1A-C, 2, and 3. The digital spatialized audio signal (e.g., the output of the binauralizor 416) may also be provided to a feedback input of the audio spatialization circuitry 410.

As described with reference to FIGS. 1A-C, position predictor 104 determines the predicted position data corresponding to a future time (e.g., a particular amount of time). The future time is selected to account for an estimated audio playback latency (e.g., a delay) associated with processing spatialized audio signals, and the predicted position data is corresponds to the future time. The latency may include or account for latency that is associated with using at least the audio spatialization circuitry 410 (e.g., the rotation matrix generator 412, the rotation matrix applier 414, and the binauralizor 416) and the DAC 418. In other implementations, the latency may also include or account for a latency that is associated with the quaternion generator 404. The position predictor 104 may determine the latency (or the latency may be provided to the position predictor 104, such as by the processor 106 of FIGS. 1A-C, 2, and 3), and the latency may select the future time such that a difference between the future time and a current time is equal to the latency. As an illustrative non-limiting example, the latency may be determined using an internal timer of an audio processing device while the audio processing device processes test data. As another illustrative non-limiting example, data indicating the latency may be determined during manufacture/testing of an audio processing device and may be available for retrieval during operation (e.g., from an Internet database, from read-only memory at the device, etc.). Thus, the position predictor 104 may determine predicted position data for a time sufficiently far in the future to account for the latency. In this manner, a user of the audio processing device 400 may not experience a lag between a movement of the user's head (or an audio device) and a change in a perceived direction or distance of a sound.

FIG. 4 illustrates a particular implementation of an audio processing device that is configured to process HOA signals using binauralization. However, in other implementations, other types of audio processing may be performed based on the predicted position data. As a particular example, the audio processing device may be configured to process object-based 3D audio (e.g., audio having audio sources represented as individual objects with 3D coordinates and directivity). The audio processing device may be configured to re-compute object position(s) in a coordinate system based on the predicted position data prior to performing binauralization (e.g., convolving audio samples with BRIRs or HRTFs). As another example, the audio processing device may be configured to process channel-based surround sound audio signals, such as 5.1 channel audio content, 7.1 channel audio content, 11.1 channel audio content, and 77.1.4 channel audio content. The audio processing device may be configured to treat each speaker as an audio object, and to perform object-based audio processing for each speaker prior to performing binauralization. As another example, the audio processing device may be configured to render HOA audio content to a channel-based format (e.g., 7.1 channel audio content or 11.1 channel audio content, as non-limiting examples), and the rendered signals may be processed as channel-based surround sound audio signals.

In the above description, various functions performed by the audio processing device 400 of FIG. 4 are described as being performed by certain components. However, this division of components is for illustration only. In an alternate implementation, a function performed by a particular component may instead be divided amongst multiple components. Moreover, in an alternate implementation, two or more components of FIG. 4 may be integrated into a single component. Each component illustrated in FIG. 4 may be implemented using hardware (e.g., a field-programmable gate array (FPGA) device, an application-specific integrated circuit (ASIC), a DSP, a controller, etc.), software (e.g., instructions executable by a processor), or a combination thereof.

Figure 5:
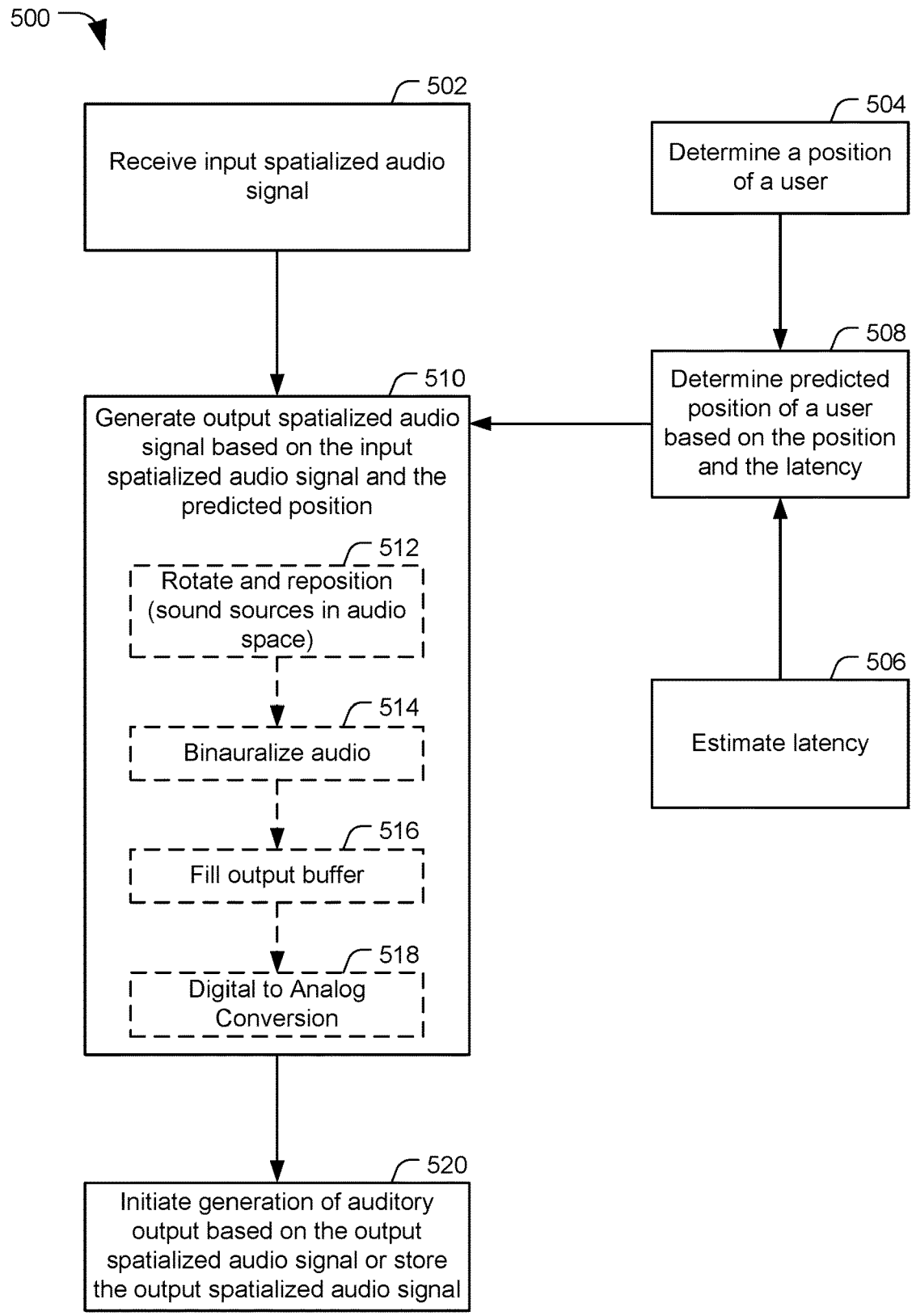
FIG. 5 is a flow chart that illustrates a particular method of audio processing.

FIG. 5 illustrates a method 500 of audio processing. The method 500 may be performed at the audio processing device 100 of FIGS. 1A-C, the audio processing device 200 of FIG. 2, the audio processing device 300 of FIG. 3, or the audio processing device 400 of FIG. 4. The method 500 includes receiving an input spatialized audio signal, at 502. For example, the processor 106 may receive the input spatialized audio signal 246 from the memory 240. The method 500 includes determining a position of a user (or an audio device), at 504, and estimating a latency associated with processing spatialized audio signals, at 506. For example, a predicted position of a user may be indicated by the sensor data 110 generated by the one or more sensors 103, and the latency associated with processing spatialized audio signals may be estimated by the position predictor 104 (or the processor 106).

The method 500 includes determining a predicted position of the user based on the position and the latency, at 508. For example, the position predictor 104 may determine the predicted position data 112 based on the sensor data 110. The predicted position data 112 may indicate a predicted position of the user (or the audio device 102) at a future time, and the future time may be selected such that a difference between the future time and a current time is equal to the latency. The method 500 includes generating an output spatialized audio signal based on the input spatialized audio signal and the predicted position, at 510. For example, the processor 106 may generate the output spatialized audio signal 114 by processing the input spatialized audio signal 246 based on the predicted position data 112, as further described with reference to FIG. 2.

In a particular implementation, generating the output spatialized signal includes rotating and repositioning sound sources in an audio space, at 512, binauralizing audio, at 514, filling an output buffer, at 516, and performing digital to analog conversion, at 518. The latency may correspond to a duration of one or more of the steps 512-518. The method 500 further includes initiating generation of an auditory output based on the output spatialized audio signal or storing the output spatialized audio signal at a memory, at 520. For example, the processor 106 may provide the output spatialized audio signal 114 to the audio device 102 to initiate an audio output at the audio device 102. Additionally or alternatively, the processor 106 may store the output spatialized audio signal 114 at the memory 240.

Figure 6:
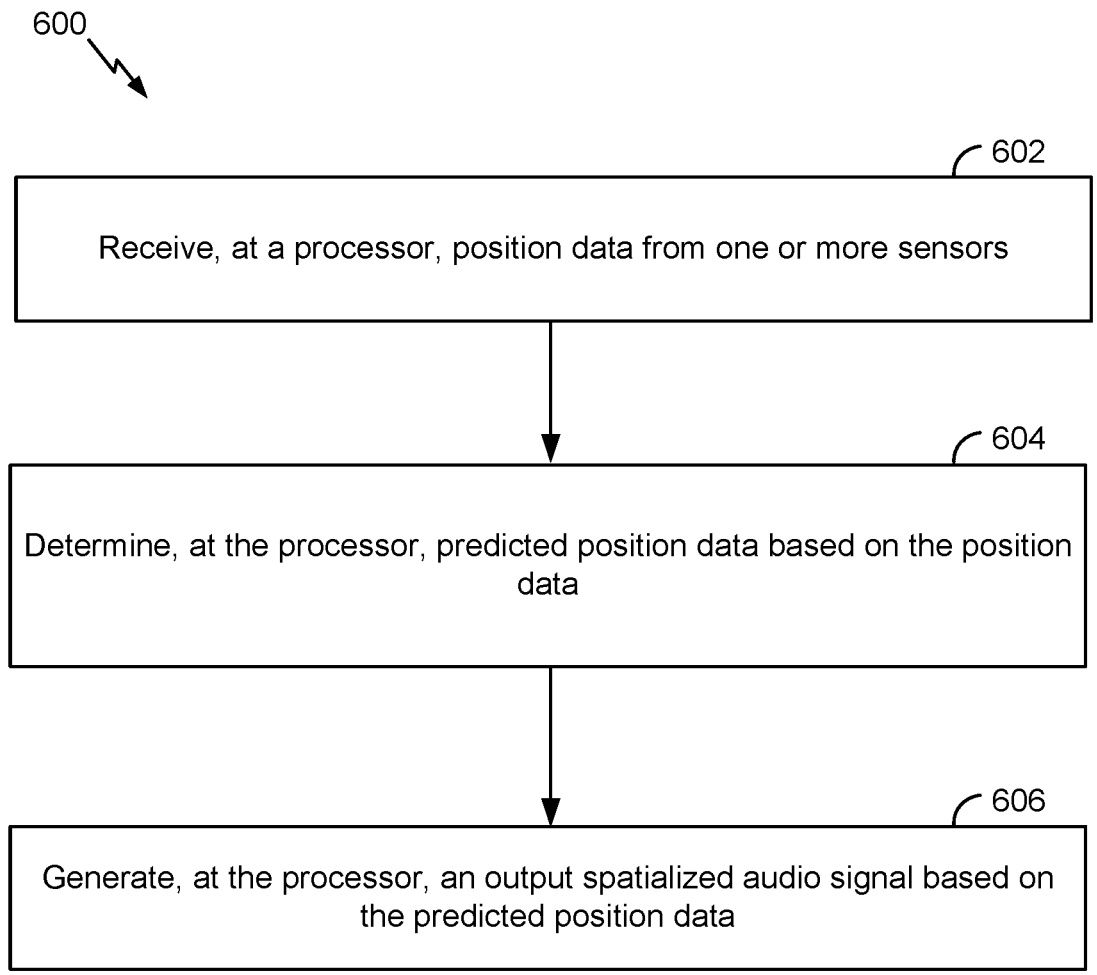
FIG. 6 is a flow chart that illustrates a particular method of generating an output spatialized audio signal based on predicted position data.

Referring to FIG. 6, a flow chart of a particular illustrative implementation of a method of generating an output spatialized audio signal based on predicted position data is shown and generally designated 600. The method 600 may be performed by the processor 106 of FIGS. 1A-C, 2, and 3 and the audio processing device 400 of FIG. 4.

The method 600 includes receiving, at a processor, position data from one or more sensors, at 602. For example, with reference to FIG. 1A, the position predictor 104 may receive the sensor data 110 (e.g., position data) from the sensors 103. In some implementations, the position predictor may be integrated within the processor. The position data may represent a position of a head of a user, an orientation of a head, or both. For example, one or more sensors may be integrated in an audio device (e.g., a headset or a HMD of a virtual reality system) that is worn on the head of the user, and the one or more sensors may determine the position and orientation of the audio device, which represents the position and orientation of the user's head. In another particular implementation, the position data represents a position of a user within a virtual environment, and the position data is received from a controller of a virtual reality (VR) system.

The method 600 includes determining, at the processor, predicted position data based on the position data, at 604. For example, with reference to FIGS. 1A-C, the position predictor 104 may determine the predicted position data 112 based on the sensor data 110.

The method 600 further includes generating, at the processor, an output spatialized audio signal based on the predicted position data, at 606. For example, with reference to FIGS. 1A-C, the processor 106 may generate the output spatialized audio signal 114 based on the predicted position data 112.

In a particular implementation, the method 600 includes determining, at the processor, an estimated latency associated with generating spatialized audio signals. The position data may correspond to a first time, the predicted position data may correspond to a second time, and a difference between the first time and the second time may be equal to the estimated latency. Estimating the latency and generating the predicted position data for a time corresponding to the estimated latency may prevent a change in an audio output from lagging behind a movement (e.g., of an audio device or a user) that causes the change.

In another particular implementation, the method 600 includes generating a rotation based on the predicted position data and applying the rotation to an input spatialized audio signal to generate the output spatialized audio signal. For example, the rotation may include or correspond to the rotation matrix generated by the rotation matrix generator 412 of FIG. 4. Alternatively, the rotation may include or correspond to other data, such as one or more vectors, one or more values retrieved from a lookup table, or other data indicative of a rotation.

In another particular implementation, the method 600 includes determining, at the processor, a first predicted trajectory based on the predicted position data. The first predicted trajectory may correspond to a presentation of an input spatialized audio signal to a user. For example, the first predicted trajectory may be indicated by the first predicted trajectory data 228 of FIG. 2. The method 600 further includes retrieving, from a memory, a first processed spatialized audio signal corresponding to the first predicted trajectory. For example, the first processed spatialized audio signal may be the first processed spatialized audio signal 242 of FIG. 2. The output spatialized audio signal may include the first processed spatialized audio signal.

In another particular implementation, the method 600 includes determining, at the processor, a first predicted trajectory and a second predicted trajectory based on the position data. The first predicted trajectory may correspond to a first presentation of an input spatialized audio signal to a user. The second predicted trajectory may correspond to a second presentation of the input spatialized audio signal to the user. For example, the first predicted trajectory may be indicated by the first predicted trajectory data 228 of FIG. 2, and the second predicted trajectory may be indicated by the second predicted trajectory data 230 of FIG. 2. The method 600 further includes retrieving, from a memory, a first processed spatialized audio signal corresponding to the first predicted trajectory and a second processed spatialized audio signal corresponding to the second predicted trajectory. For example, the first processed spatialized audio signal may be the first processed spatialized audio signal 242 of FIG. 2, and the second processed spatialized audio signal may be the second processed spatialized audio signal 244 of FIG. 2. A first portion of the output spatialized audio signal may include the first processed spatialized audio signal, and a second portion of the output spatialized audio signal may include the second processed spatialized audio signal. The first processed spatialized audio signal and the second processed spatialized audio signal may be generated prior to receiving the position data.

The method 600 may also include buffering a first set of audio frames based on the first processed spatialized audio signal, buffering a second set of audio frames based on the first processed spatialized audio signal, the second processed spatialized audio signal, and a fading factor, and buffering a third set of audio frames based on the second processed spatialized audio signal. For example, the fading factor may include the fading factor 252 of FIG. 2. The method 600 may also include buffering a set of audio frames based on the first processed spatialized audio signal, a second processed spatialized audio signal, and a panning factor. The panning factor may indicate a ratio of frames based on the first processed spatialized audio signal to frames based on the second processed audio signal. For example, the panning factor may include the panning factor 250 of FIG. 2.

In another particular implementation, the method 600 includes comparing, at the processor, available resources to one or more thresholds and processing an input spatialized audio signal based on the predicted position data to generate the output spatialized audio signal in response to determining that the available resources exceed the one or more thresholds. For example, the resource analyzer 260 of FIG. 2 may compare available resources to the threshold(s) 248. In another particular implementation, the method 600 includes comparing, at the processor, available resources to one or more threshold(s) and retrieving a processed audio signal from a memory based on the predicted position data in response to determining that the available resources fail to exceed the one or more thresholds. For example, one of the first processed spatialized audio signal 242 or the second processed spatialized audio signal 244 may be retrieved in response to available resources failing to exceed the threshold(s) 248.

The method 600 compensates for a delay (e.g., a latency) associated with generating spatialized audio signals by generating output spatialized audio signals based on predicted position data instead of based on current position data. In this manner, a change in a perceived direction or distance of a sound does not lag behind a movement of a user (or an audio device) due to audio processing latency, which may enhance a user experience.

Figure 7:
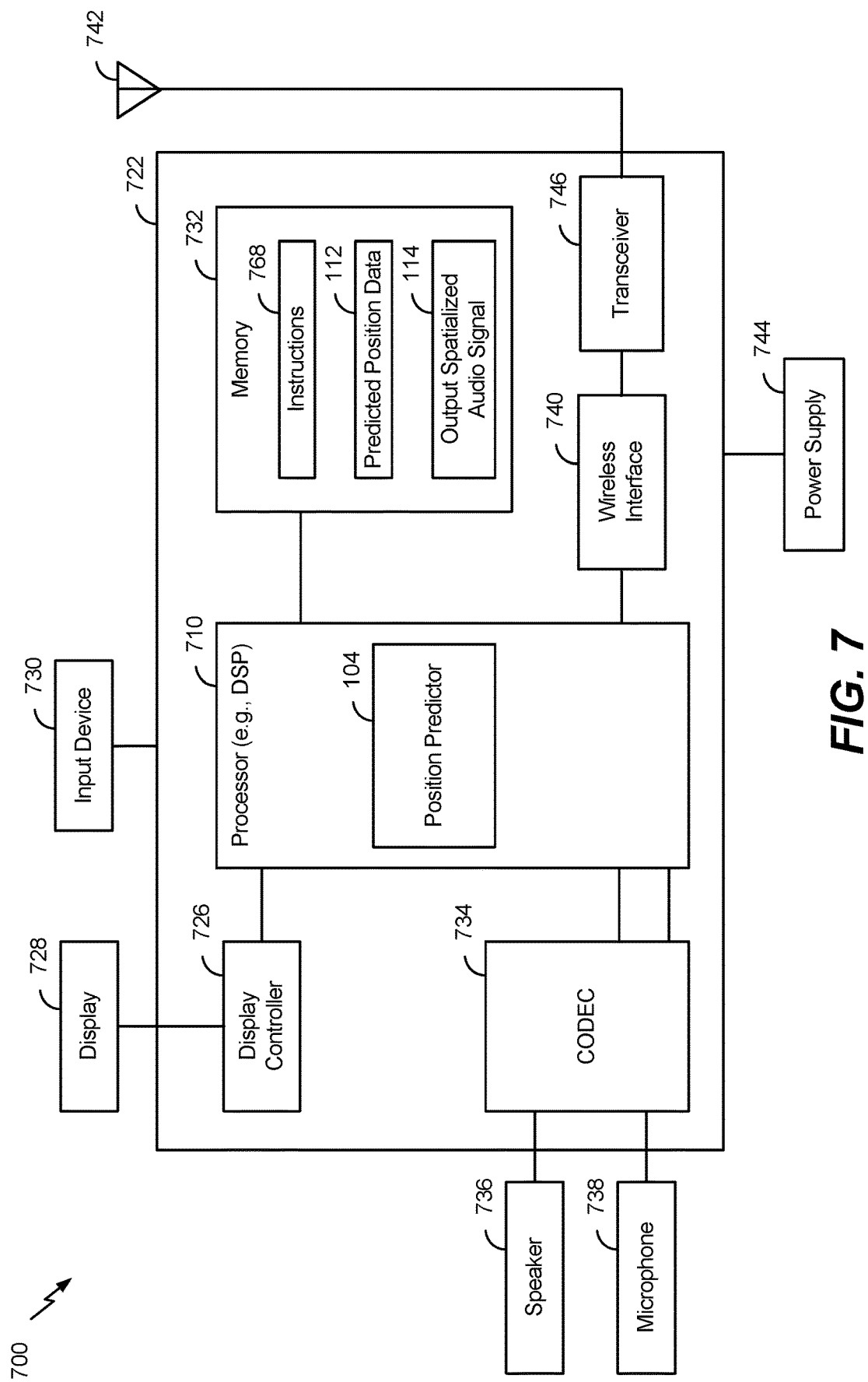
FIG. 7 is a block diagram of a wireless device that is operable to perform operations in accordance with the systems and methods of FIGS. 1A-C and 2-6.

Referring to FIG. 7, a block diagram of a particular illustrative implementation of a device (e.g., a wireless communication device) is depicted and generally designated 700. In various implementations, the device 700 may have more or fewer components than illustrated in FIG. 7.

In a particular implementation, the device 700 includes a processor 710, such as a central processing unit (CPU) or a digital signal processor (DSP), coupled to a memory 732. The processor 710 may include or correspond to the processor 106 of FIGS. 1A-C, 2, and 3. The processor 710 may include the position predictor 104 of FIGS. 1A-C, and 2-4. For example, the processor 710 may include a component (e.g., circuitry, a FPGA, an ASIC, etc.) that includes the position predictor 104.

The memory 732 includes instructions 768 (e.g., executable instructions) such as computer-readable instructions or processor-readable instructions. The instructions 768 may include one or more instructions that are executable by a computer, such as the processor 710. In some implementations, the memory 732 also includes the predicted position data 112 and the output spatialized audio signal 114 of FIGS. 1A-C, 2, and 3. To illustrate, the position predictor 104 may be configured to receive sensor data (e.g., position data) and to generate the predicted position data 112 based on the sensor data. The processor 710 may be configured to generate the output spatialized audio signal 114 based on the predicted position data 112, as described with reference to FIGS. 1A-C, 2, and 3.

FIG. 7 also illustrates a display controller 726 that is coupled to the processor 710 and to a display 728. A coder/decoder (CODEC) 734 may also be coupled to the processor 710. A speaker 736 and a microphone 738 may be coupled to the CODEC 734.

FIG. 7 also illustrates that a wireless interface 740, such as a wireless controller, and a transceiver 746 may be coupled to the processor 710 and to an antenna 742, such that wireless data received via the antenna 742, the transceiver 746, and the wireless interface 740 may be provided to the processor 710. In some implementations, the processor 710, the display controller 726, the memory 732, the CODEC 734, the wireless interface 740, and the transceiver 746 are included in a system-in-package or system-on-chip device 722. In some implementations, an input device 730 and a power supply 744 are coupled to the system-on-chip device 722. Moreover, in a particular implementation, as illustrated in FIG. 7, the display 728, the input device 730, the speaker 736, the microphone 738, the antenna 742, and the power supply 744 are external to the system-on-chip device 722. In a particular implementation, each of the display 728, the input device 730, the speaker 736, the microphone 738, the antenna 742, and the power supply 744 may be coupled to a component of the system-on-chip device 722, such as an interface or a controller.

The device 700 may include a headset, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof.

In an illustrative implementation, the memory 732 includes or stores the instructions 768 (e.g., executable instructions), such as computer-readable instructions or processor-readable instructions. For example, the memory 732 may include or correspond to a non-transitory computer readable medium storing the instructions 768. The instructions 768 may include one or more instructions that are executable by a computer, such as the processor 710. The instructions 768 may cause the processor 710 to perform the method 500 of FIG. 5 or the method 600 of FIG. 6.

In a particular implementation, the instructions 768, when executed by the processor 710, may cause the processor 710 to receive position data from one or more sensors. For example, the processor 710 may be configured to wirelessly communicate via the antenna 742 with one or more sensors (e.g., the sensors 103 of FIGS. 1A-C, 2, and 3) to receive sensor data. The instructions 768 may cause the processor 710 to determine the predicted position data 112 based on the position data, as described with reference to FIGS. 1A-C and 2. The instructions 768 may further cause the processor 710 to generate the output spatialized audio signal 114 based on the predicted position data 112. In a particular implementation, the processor 710 may generate the output spatialized audio signal 114 by processing an input spatialized audio signal in real time (or near real time) based on the predicted position data 112. In another particular implementation, the processor 710 may retrieve a processed spatialized audio signal from the memory 732 based on the predicted position data 112. The instructions 768 may further cause the processor 710 to initiate an audio output at an audio device based on the output spatialized audio signal 114.

In conjunction with the described aspects, a first apparatus includes means for determining predicted position data based on position data. The means for determining may include or correspond to the position predictor 104 of FIGS. 1A-C, 2-4, and 7, one or more other structures or circuits configured to determine predicted position data based on position data, or any combination thereof.

The first apparatus further includes means for generating an output spatialized audio signal based on the predicted position data. The means for generating may include or correspond to the processor 106 of FIGS. 1A-C, 2, and 3, the processor 710 of FIG. 7, one or more other structures or circuits configured to generate the output spatialized audio signal based on the predicted position data, or any combination thereof.

In a particular implementation, the first apparatus further includes means for processing higher order ambisonic (HOA) signals. For example, the means for processing may include the processor 106 of FIGS. 1A-C, 2, and 3, the audio spatialization circuitry 410 of FIG. 4, the processor 710 of FIG. 7, one or more other structures or circuits configured to process the HOA signals, or any combination thereof. In another particular implementation, the first apparatus further includes means for determining, based on available resources, whether to generate the output spatialized audio signal based on an input spatialized audio signal in real-time or based on a pre-processed spatialized audio signal. For example, the means for determining whether to generate the output spatialized signal may include the processor 106 of FIGS. 1A-C, 2, and 3, the resource analyzer 260 of FIGS. 2-3, the processor 710 of FIG. 7, one or more other structures or circuits configured to determine, based on the available resources, whether to generate the output spatialized audio signal based on the input spatialized audio signal in real-time or based on the pre-processed spatialized audio signal, or any combination thereof.

One or more of the disclosed aspects may be implemented in a system or an apparatus, such as the device 700, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 700 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, a component integrated within a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Although one or more of FIGS. 1A-C and 2-7 may illustrate systems, apparatuses, and/or methods according to the teachings of the disclosure, the disclosure is not limited to these illustrated systems, apparatuses, and/or methods. One or more functions or components of any of FIGS. 1A-C and 2-7 as illustrated or described herein may be combined with one or more other portions of another of FIGS. 1A-C and 2-7. Accordingly, no single implementation described herein should be construed as limiting and implementations of the disclosure may be suitably combined without departing form the teachings of the disclosure. As an example, the method 600 of FIG. 6 may be performed by the processor 106 of FIGS. 1A-C and 2, or the processor 710 of FIG. 7. Additionally, one or more operations described with reference to FIGS. 5 and 6 may be optional, may be performed at least partially concurrently, and/or may be performed in a different order than shown or described.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal.

In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device comprising:
   a memory configured to store instructions; and
   a processor coupled to the memory, the processor configured to:
      receive position data, the position data indicating a translational position, an orientation, or both associated with a headset that includes the processor at a first time;
      determine predicted position data based on the position data, the predicted position data indicating a predicted translational position, a predicted orientation, or both, that is associated with the headset at a second time that is subsequent to the first time and that is based on an estimated latency associated with processing an input spatialized audio signal that includes a multi-channel representation of a three-dimensional (3D) sound field;
      apply, to the input spatialized audio signal, a rotation to adjust an orientation of the 3D sound field based on the predicted orientation and a binauralization to generate a binaural audio signal; and
      output the binaural audio signal to transducers of the headset for playback.

2. The device of claim 1, wherein the processor is configured to apply the rotation via processing of the multi-channel representation of the 3D sound field based on a rotation operation.

3. The device of claim 1, wherein the processor is further configured to apply a translation to the 3D sound field based on the predicted translational position.

4. The device of claim 1, further comprising the transducers coupled to the processor.

5. The device of claim 4, further comprising a display coupled to the processor.

6. The device of claim 5, wherein the transducers are configured to generate audio associated with a virtual reality or augmented reality application, and wherein the display is configured to display visual information associated with the virtual reality or augmented reality application.

7. The device of claim 1, further comprising one or more sensors coupled to the processor and configured to provide the position data to the processor.

8. The device of claim 7, further comprising a camera coupled to the processor.

9. The device of claim 1, wherein the processor is further configured to:
   receive second position data, the second position data indicating an updated translational position, an updated orientation, or both, that is associated with the headset at a third time; and
   determine second predicted position data based on the second position data, the second predicted position data indicating a second predicted translational position, a second predicted orientation, or both, associated with a fourth time that is subsequent to the third time.

10. The device of claim 9, further comprising a transceiver coupled to the processor and configured to:
   wirelessly transmit an indication of at least the second predicted translational position to a second device; and
   receive an updated spatialized audio signal from the second device, the received updated spatialized audio signal corresponding to a translated 3D sound field that is based on the indication.

11. The device of claim 10, wherein the updated spatialized audio signal is selected, based on the second predicted position data, from among multiple stored 3D audio signals corresponding to different positions of a playback device.

12. The device of claim 10, wherein the processor is further configured to, prior to playback of the updated spatialized audio signal received from the second device, adjust the updated spatialized audio signal based on a second updated translational position, a second updated orientation, or both, for the fourth time.

13. The device of claim 1, wherein the multi-channel representation of the 3D sound field corresponds to ambisonics data.

14. A method comprising:
   receiving, at a processor, position data indicating a translational position, an orientation, or both, associated with a headset that includes the processor at a first time;
   determining, at the processor, predicted position data based on the position data, the predicted position data indicating a predicted translational position, a predicted orientation, or both, that is associated with the headset at a second time that is subsequent to the first time and that is based on an estimated latency associated with processing an input spatialized audio signal that includes a multi-channel representation of a three-dimensional (3D) sound field;
   applying, at the processor, a rotation to the input spatialized audio signal to adjust an orientation of the 3D sound field based on the predicted orientation and a binauralization to generate a binaural audio signal; and
   outputting the binaural audio signal to transducers of the headset for playback.

15. The method of claim 14, further comprising:
   receiving second position data, the second position data indicating an updated translational position, an updated orientation, or both, that is associated with the headset at a third time;
   determining second predicted position data based on the second position data, the second predicted position data indicating a second predicted translational position, a second predicted orientation, or both, associated with a fourth time that is subsequent to the third time;
   wirelessly transmitting an indication of at least the second predicted translational position to a second device; and
   receiving an updated spatialized audio signal from the second device, the received updated spatialized audio signal corresponding to a translated 3D sound field that is based on the indication.

16. The method of claim 15, wherein the updated spatialized audio signal is selected, based on the second predicted position data, from among multiple stored 3D audio signals corresponding to different positions of a playback device.

17. The method of claim 14, wherein the multi-channel representation of the 3D sound field corresponds to ambisonics data.

18. A device comprising:
a memory configured to store instructions; and
a processor coupled to the memory, the processor configured to:
obtain predicted position data indicating a predicted translational position, a predicted orientation, or both, that is associated with a remote device and that is based on an estimated latency associated with processing an input spatialized audio signal that includes a multi-channel representation of a three-dimensional (3D) sound field;
perform one or more modifications to the input spatialized audio signal to generate an output audio signal, the one or more modifications including a translation to adjust a position of the 3D sound field based on the predicted translational position; and
initiate wireless transmission of the output audio signal to the remote device.

19. The device of claim 18, wherein the remote device includes a headset.

20. The device of claim 18, wherein the one or more modifications further include a rotation to adjust an orientation of the 3D sound field based on the predicted orientation.

21. The device of claim 20, wherein the processor is configured to perform the rotation via processing of the multi-channel representation of the 3D sound field based on a rotation operation.

22. The device of claim 20, wherein the one or more modifications further include a binauralization.

23. The device of claim 18, further comprising a transceiver configured to receive position data, the position data indicating a translational position, an orientation, or both, that is associated with the remote device at a first time.

24. The device of claim 23, wherein the processor is coupled to the transceiver and is further configured to determine the predicted position data based on the position data, the predicted position data indicating the predicted translational position, the predicted orientation, or both, wherein the predicted position data is based on a second time that is subsequent to the first time and that is based on the estimated latency.

25. The device of claim 18, wherein the processor is further configured to:
obtain second predicted position data indicating a second predicted translational position, a second predicted orientation, or both, and associated with the remote device at a third time that is subsequent to the second time; and
select, based on the second predicted position data, an updated output audio signal from among multiple stored 3D audio signals corresponding to different positions of a playback device.

26. The device of claim 18, wherein the multi-channel representation of the 3D sound field corresponds to ambisonics data.

27. A method comprising:
obtaining, at a processor, predicted position data indicating a predicted translational position, a predicted orientation, or both, that is associated with a remote device and that is based on an estimated latency associated with processing an input spatialized audio signal that includes a multi-channel representation of a three-dimensional (3D) sound field;
performing, at the processor, one or more modifications to the input spatialized audio signal to generate an output audio signal, the one or more modifications including a translation to adjust a position of the 3D sound field based on the predicted translational position; and
initiating wireless transmission of the output audio signal to the remote device.

28. The method of claim 27, further comprising receiving position data, the position data indicating a translational position, an orientation, or both, that is associated with the remote device at a first time.

29. The method of claim 28, wherein obtaining the predicted position data includes determining the predicted position data based on the position data, and wherein the predicted position data is based on a second time that is subsequent to the first time.

30. The method of claim 29, further comprising:
obtaining second predicted position data indicating a second predicted translational position, a second predicted orientation, or both, and associated with the remote device at a third time that is subsequent to the second time; and
selecting, based on the second predicted position data, an updated output audio signal from among multiple stored 3D audio signals corresponding to different positions of a playback device; and
initiating wireless transmission of the updated output audio signal to the remote device.

* * * * *